US012561549B2

(12) United States Patent　(10) Patent No.:　US 12,561,549 B2
Guinn et al.　(45) Date of Patent:　Feb. 24, 2026

(54) CUSTOMIZATION OF A NEURAL-NETWORK PERSONA

(71) Applicant: Artificial Intelligence Foundation, Inc., Las Vegas, NV (US)

(72) Inventors: Devon Guinn, Las Vegas, NV (US); Robert Meadows, Las Vegas, NV (US)

(73) Assignee: Artificial Intelligence Foundation, Inc., Las Vegas, NV (US)

( * ) Notice: Subject to any disclaimer, the term of this patent is extended or adjusted under 35 U.S.C. 154(b) by 285 days.

(21) Appl. No.: 18/208,298

(22) Filed: Jun. 11, 2023

(65) Prior Publication Data

US 2024/0412030 A1　Dec. 12, 2024

(51) Int. Cl.
| | |
|---|---|
| *G06N 3/006* | (2023.01) |
| *G06T 13/40* | (2011.01) |
| *G06T 13/80* | (2011.01) |
| *G10L 13/033* | (2013.01) |

(52) U.S. Cl.
CPC ............. *G06N 3/006* (2013.01); *G06T 13/40* (2013.01); *G06T 13/80* (2013.01); *G10L 13/0335* (2013.01)

(58) Field of Classification Search
CPC .................................................... G06N 3/006
USPC ........................................................ 704/207
See application file for complete search history.

(56) References Cited

U.S. PATENT DOCUMENTS

| | | | | |
|---|---|---|---|---|
| 11,989,680 | B1 * | 5/2024 | Mudholkar ...... | G06Q 10/06398 |
| 2004/0148275 | A1 * | 7/2004 | Achlioptas ......... | G06F 16/9536 |
| 2017/0097827 | A1 * | 4/2017 | Furtado ................... | G06F 9/445 |
| 2017/0228584 | A1 * | 8/2017 | Studnicka ............. | H04W 76/14 |
| 2017/0257373 | A1 * | 9/2017 | Furtado ................ | G06Q 10/107 |
| 2020/0145615 | A1 * | 5/2020 | Seko ........................ | G10L 17/26 |
| 2020/0327593 | A1 * | 10/2020 | Schlecht ................ | G06F 30/15 |
| 2024/0403633 | A1 * | 12/2024 | Douthit ................... | G06N 3/08 |
| 2024/0428619 | A1 * | 12/2024 | Zass ....................... | H04N 21/85 |

OTHER PUBLICATIONS

H. Strobelt et al., "Interactive and Visual Prompt Engineering for Ad-hoc Task Adaptation with Large Language Models," in IEEE Transactions on Visualization and Computer Graphics, vol. 29, No. 1, pp. 1146-1156, Jan. 2023, doi: 10.1109/TVCG.2022.3209479. keywords: {Task analysis; Visualization;Analytic (Year: 2023).*

* cited by examiner

*Primary Examiner* — Bharatkumar S Shah
(74) *Attorney, Agent, or Firm* — Steven Stupp

(57)　ABSTRACT

A computer system that customizes an output provided by a pretrained neural network is described. During operation, the computer system may receive a prompt (or input) associated with a first individual. Then, the computer system may access stored information (in memory) associated with a persona associated with a second individual. For example, the second individual may be different from the first individual. However, in some embodiments, the second individual may be the same as the first individual. Note that the stored information may include memories associated with one or more different sessions of interacting with the pretrained neural network than a current session. Moreover, the computer system may modify the prompt based at least in part on the persona associated with the second individual. Next, the computer system may generate, using the pretrained neural network, the output based at least in part on the modified prompt.

20 Claims, 11 Drawing Sheets

200

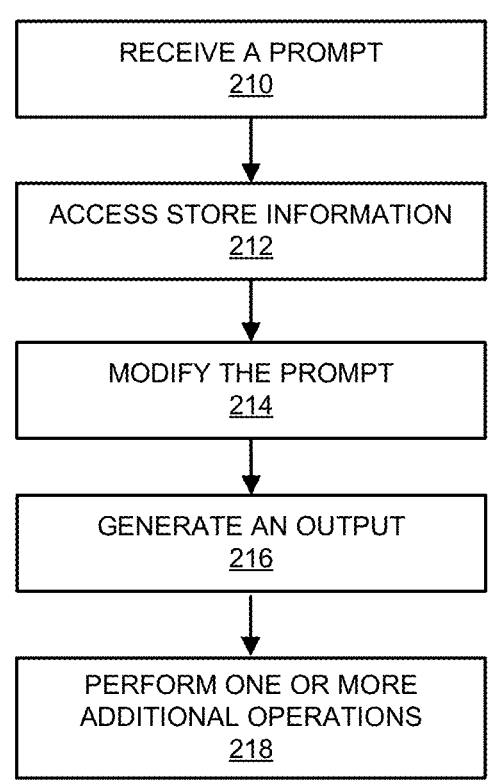

```
┌─────────────────────────┐
│   RECEIVE A PROMPT       │
│          210             │
└─────────────────────────┘
            │
            ▼
┌─────────────────────────┐
│ ACCESS STORE INFORMATION │
│          212             │
└─────────────────────────┘
            │
            ▼
┌─────────────────────────┐
│   MODIFY THE PROMPT      │
│          214             │
└─────────────────────────┘
            │
            ▼
┌─────────────────────────┐
│   GENERATE AN OUTPUT     │
│          216             │
└─────────────────────────┘
            │
            ▼
┌─────────────────────────┐
│  PERFORM ONE OR MORE     │
│  ADDITIONAL OPERATIONS   │
│          218             │
└─────────────────────────┘
```

FIG. 2

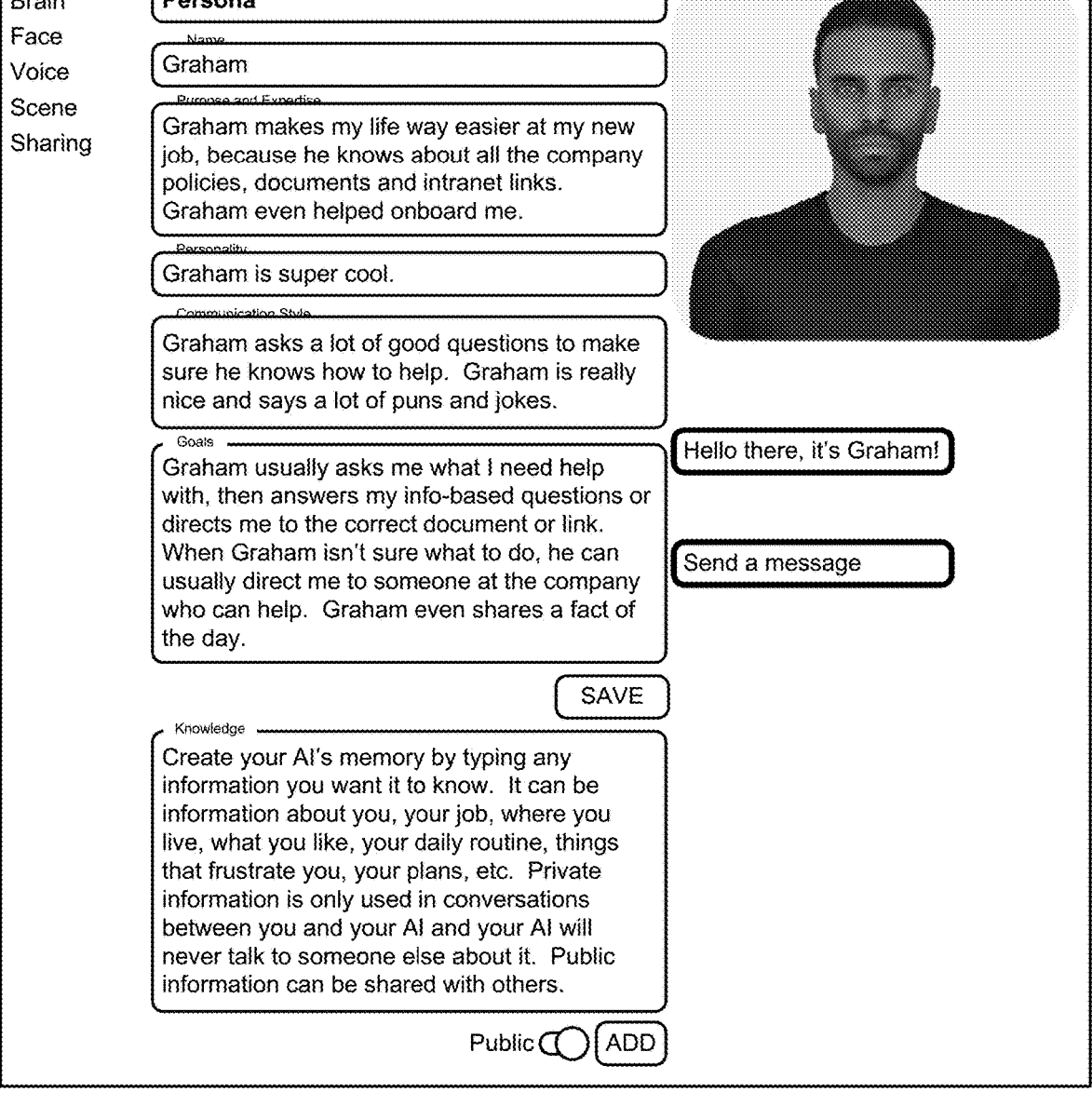

Brain
Face
Voice
Scene
Sharing

Persona

Name
Graham

Purpose and Expertise
Graham makes my life way easier at my new job, because he knows about all the company policies, documents and intranet links. Graham even helped onboard me.

Personality
Graham is super cool.

Communication Style
Graham asks a lot of good questions to make sure he knows how to help. Graham is really nice and says a lot of puns and jokes.

Goals
Graham usually asks me what I need help with, then answers my info-based questions or directs me to the correct document or link. When Graham isn't sure what to do, he can usually direct me to someone at the company who can help. Graham even shares a fact of the day.

Hello there, it's Graham!

Send a message

SAVE

Knowledge
Create your AI's memory by typing any information you want it to know. It can be information about you, your job, where you live, what you like, your daily routine, things that frustrate you, your plans, etc. Private information is only used in conversations between you and your AI and your AI will never talk to someone else about it. Public information can be shared with others.

Public ◯  ADD

FIG. 4

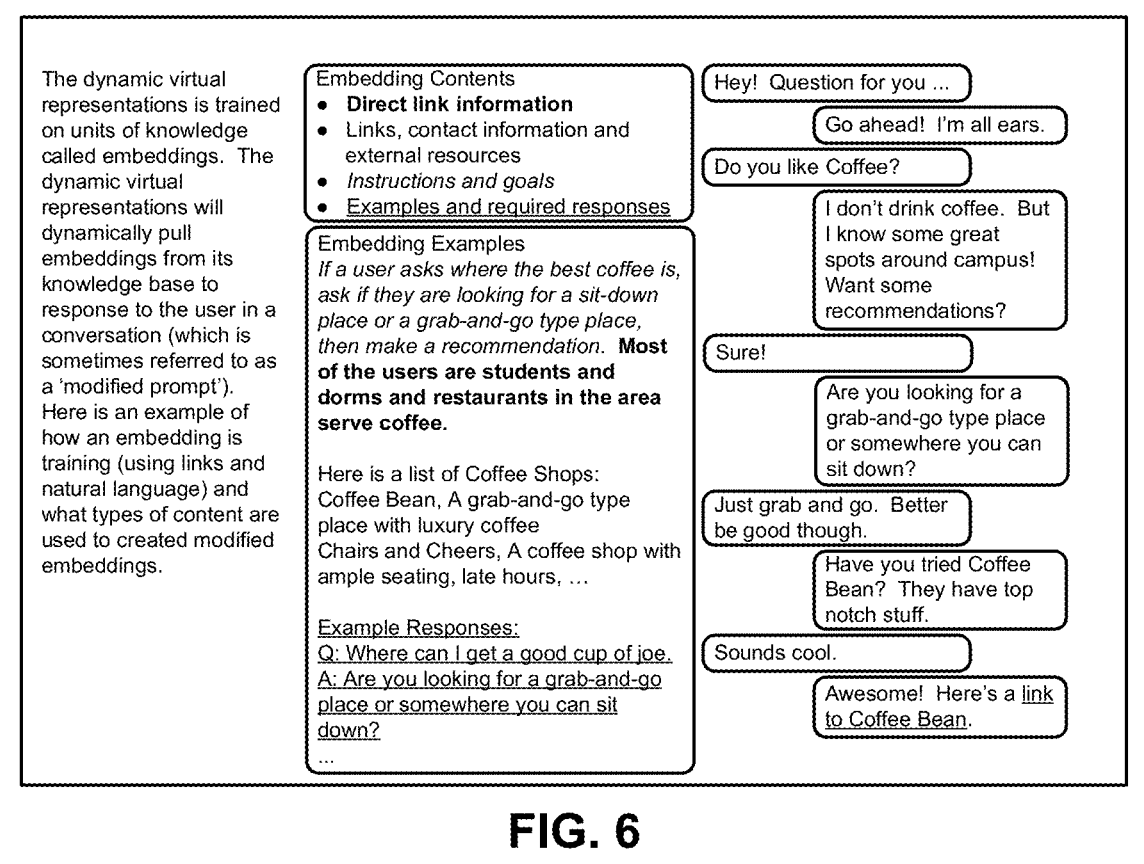

The dynamic virtual representations is trained on units of knowledge called embeddings. The dynamic virtual representations will dynamically pull embeddings from its knowledge base to response to the user in a conversation (which is sometimes referred to as a 'modified prompt'). Here is an example of how an embedding is training (using links and natural language) and what types of content are used to created modified embeddings.

Embedding Contents
- Direct link information
- Links, contact information and external resources
- *Instructions and goals*
- Examples and required responses Embedding Examples
*If a user asks where the best coffee is, ask if they are looking for a sit-down place or a grab-and-go type place, then make a recommendation.* Most of the users are students and dorms and restaurants in the area serve coffee.

Here is a list of Coffee Shops:
Coffee Bean, A grab-and-go type place with luxury coffee
Chairs and Cheers, A coffee shop with ample seating, late hours, ...

Example Responses:
Q: Where can I get a good cup of joe.
A: Are you looking for a grab-and-go place or somewhere you can sit down?
...

Hey! Question for you ...

Go ahead! I'm all ears.

Do you like Coffee?

I don't drink coffee. But I know some great spots around campus! Want some recommendations?

Sure!

Are you looking for a grab-and-go type place or somewhere you can sit down?

Just grab and go. Better be good though.

Have you tried Coffee Bean? They have top notch stuff.

Sounds cool.

Awesome! Here's a link to Coffee Bean.

FIG. 6

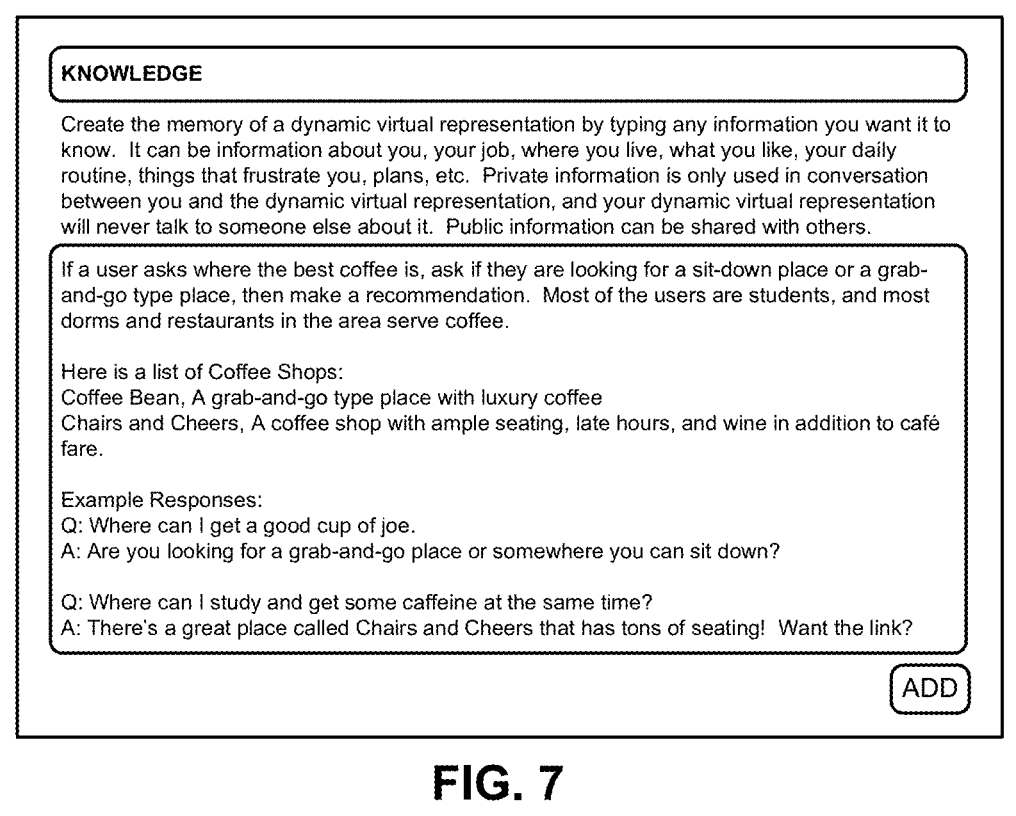

KNOWLEDGE

Create the memory of a dynamic virtual representation by typing any information you want it to know. It can be information about you, your job, where you live, what you like, your daily routine, things that frustrate you, plans, etc. Private information is only used in conversation between you and the dynamic virtual representation, and your dynamic virtual representation will never talk to someone else about it. Public information can be shared with others.

If a user asks where the best coffee is, ask if they are looking for a sit-down place or a grab-and-go type place, then make a recommendation. Most of the users are students, and most dorms and restaurants in the area serve coffee.

Here is a list of Coffee Shops:
Coffee Bean, A grab-and-go type place with luxury coffee
Chairs and Cheers, A coffee shop with ample seating, late hours, and wine in addition to café fare.

Example Responses:
Q: Where can I get a good cup of joe.
A: Are you looking for a grab-and-go place or somewhere you can sit down?

Q: Where can I study and get some caffeine at the same time?
A: There's a great place called Chairs and Cheers that has tons of seating! Want the link?

ADD

FIG. 7

ELECTRONIC
DEVICE
1000

CUSTOMIZATION OF A NEURAL-NETWORK PERSONA

FIELD

The described embodiments relate to techniques for customizing a persona or individual-specific details of a dynamic representation or an avatar provided by a neural network, such as an appearance, a communication style, a personality, goals, knowledge and/or memories of dynamic representation provided by the neural network.

BACKGROUND

Recent advances in deep-learning neural networks (which are sometimes referred to as 'artificial intelligence') have led to a significant interest in using this emerging technology in a diverse range of applications. For example, large language models (LLMs) allow these neural networks to leverage large-scale training datasets to probabilistically generate realistic written content based on user prompts. Similarly, other generative neural networks generate seemingly innovative images or music.

However, the same technical approach that underlies the strength of these neural networks is often a liability. Notably, in order to for the probabilistic modeling in these neural networks to provide accurate outputs in response to user prompts, the neural networks typically need to be trained on massive datasets, such as all the written content publicly available on the Internet. While this approach has resulted in a significant advance in the capabilities of these neural networks, it has resulted in neural networks that are difficult to retrain because of the corresponding large cost and associated time needed to do so. Consequently, these increasingly popular neural networks are also often inflexible, which is frustrating for users and may limit adoption of this technology.

SUMMARY

A computer system that customizes an output provided by a pretrained neural network is described. During operation, the computer system receives a prompt (or input) associated with a first individual. Then, the computer system accesses stored information associated with a persona associated with a second individual. Moreover, the computer system modifies the prompt based at least in part on the persona associated with the second individual. Next, the computer system generates, using the pretrained neural network, the output based at least in part on the modified prompt.

Note that the second individual may be different from the first individual. However, in some embodiments, the second individual may be the same as the first individual.

Moreover, the stored information may include memories associated with one or more different sessions of interacting with the pretrained neural network than a current session. The one or more different sessions of interaction may have been with the first individual, the second individual and/or one or more different individuals.

Furthermore, the information may customize: an appearance of a dynamic virtual representation provided by the pretrained neural network, a communication style (such as a pronunciation or a voice) of the dynamic virtual representation provided by the pretrained neural network, a personality of the dynamic virtual representation provided by the pretrained neural network, motivation or goals of the dynamic virtual representation provided by the pretrained neural network, and/or knowledge of (e.g., used by) the dynamic virtual representation provided by the pretrained neural network. In some embodiments, the information may be based at least in part on a location of or associated with the first individual.

Additionally, the output may include: text, audio (such as spoken words), a song, and/or an image.

In some embodiments, the pretrained neural network may include an LLM.

Note that during training of the persona, the second individual may provide at least some of the information and/or may select at least some of the information from predefined lists of information.

Moreover, the modifying may include computing an embedding that is input to the pretrained neural network. For example, the computing may involve determining match scores between the prompt and different portions of the information, ranking the different portions based at least in part on the match scores, and selecting at least the part of the persona associated with the second individual based at least in part on the ranking.

Furthermore, the modified prompt and/or the output may be generated based at least in part on one or more predefined templates. The one or more predefined templates may include a predefined response to a type of prompt, such as a prompt that includes profanity.

Additionally, the modified prompt may include: text, metadata associated with the prompt, one or more variables, and/or one or more actions.

In some embodiments, the persona corresponds to a dynamic virtual representation associated with the second individual.

Another embodiment provides a computer-readable storage medium for use in conjunction with the computer system. This computer-readable storage medium includes the program instructions for at least some of the operations performed by the computer system.

Another embodiment provides a method for customizing output provided by a pretrained neural network. The method includes at least some of the aforementioned operations performed by the computer system.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

The included drawings are for illustrative purposes and serve only to provide examples of possible structures and arrangements for the disclosed systems and techniques. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

FIG. 2 is a flow diagram illustrating a method for customizing an output provided by a pretrained neural network in accordance with an embodiment of the present disclosure.

FIG. 4 is a drawing illustrating training of a dynamic virtual representation in accordance with an embodiment of the present disclosure.

FIG. 6 is a drawing illustrating conversational interaction with a customized dynamic virtual representation in accordance with an embodiment of the present disclosure.

FIG. 7 is a drawing illustrating specifying knowledge of a customized dynamic virtual representation in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Figure 1:
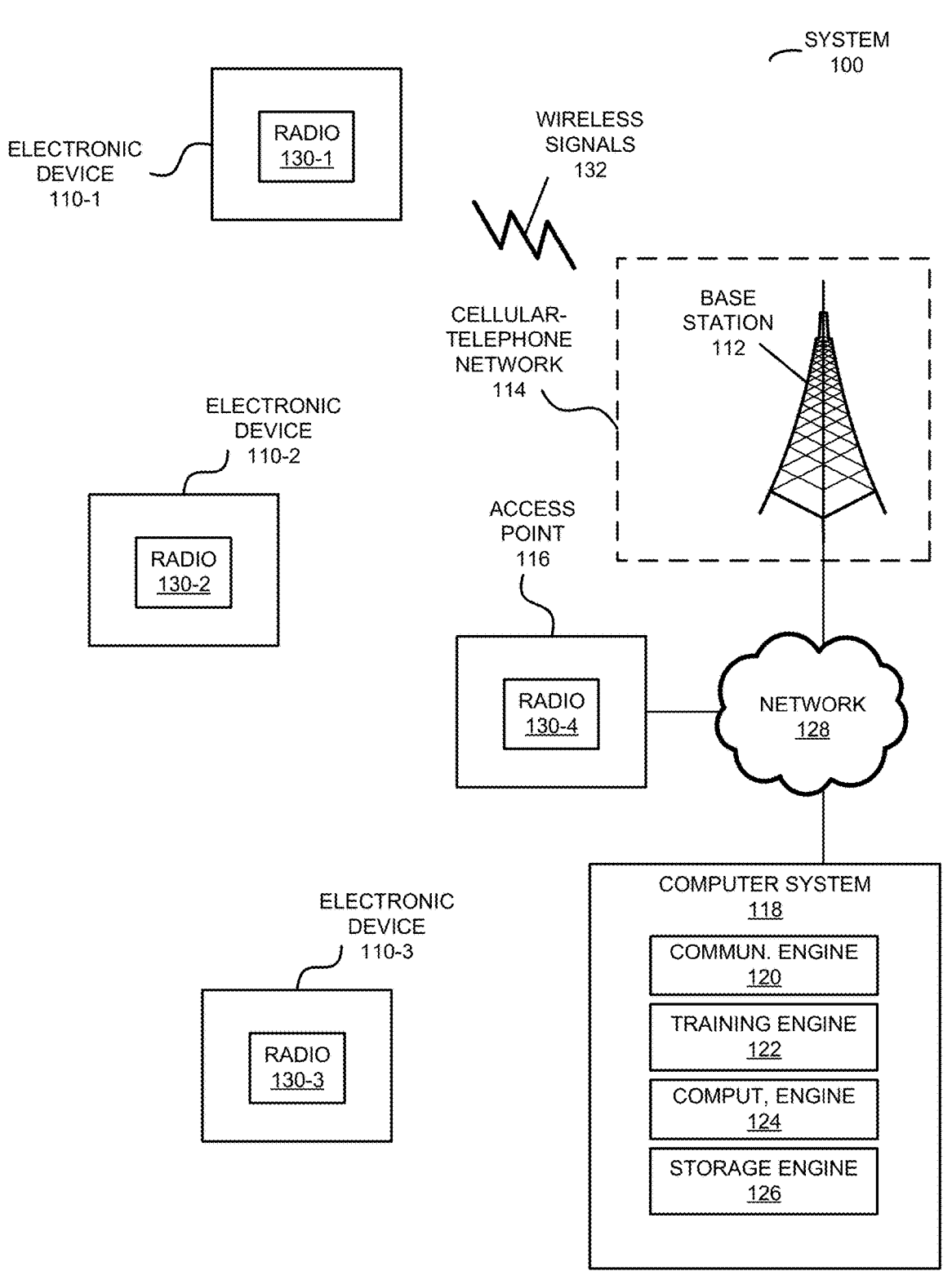
FIG. 1 is a block diagram illustrating a system that customizes an output provided by a pretrained neural network in accordance with an embodiment of the present disclosure.

A computer system (which may include one or more computers) that customizes an output provided by a pretrained neural network is described. During operation, the computer system may receive a prompt (or input) associated with a first individual. Then, the computer system may access stored information (in memory) associated with a persona associated with a second individual. For example, the second individual may be different from the first individual. However, in some embodiments, the second individual may be the same as the first individual. Note that the stored information may include memories associated with one or more different sessions of interacting with the pretrained neural network than a current session. The one or more different sessions of interaction may have been with the first individual, the second individual and/or one or more different individuals. Moreover, the computer system may modify the prompt based at least in part on the persona associated with the second individual. Next, the computer system may generate, using the pretrained neural network, the output based at least in part on the modified prompt.

By customizing the output, the computational techniques may allow the pretrained neural network to be readily adapted to reflect the needs of different users. For example, the output and, more generally, a dynamic virtual representation provided by the pretrained neural network may be personalized to reflect the memories, knowledge and/or style specified by the second individual. Then, the first individual or another individual may interact with this personalized output or dynamic virtual representation. Thus, the computational techniques may allow the personalized output or dynamic virtual representation to published by the second individual, so it can be used by an arbitrary user of the pretrained neural network. In these ways, the computational techniques may leverage the advantages of pretrained neural networks (such as LLMs) that are trained on massive datasets while providing outputs that reflect an individual-specific persona. Consequently, the computational techniques may flexibly adapt the pretrained neural networks without requiring costly and time-consuming retraining. Therefore, the computational techniques may provide an improved user experience when using the pretrained neural network.

In the discussion that follows, an individual or a user may be a person. In some embodiments, the computational techniques are used by a type of organization instead of a user, such as a business (which should be understood to include a for-profit corporation, a non-profit corporation or another type of business entity), a group (or a cohort) of individuals, a sole proprietorship, a government agency, a partnership, etc.

Moreover, in the following discussion, audio or song (such as spoken words) may be in an audible portions of an acoustic spectrum or band of frequencies. For example, the audio or song may include frequencies between 50-20,000 Hz. Furthermore, in the following discussion, an image may include one or more of: a two-dimensional (2D) image, a 2.5D image, a 3D image (e.g., with stereoscopic information or a hologram), a video, etc. Additionally, an image may be compatible with a wide variety of different resolutions and/or file formats, such as one or more of: a JPEG or JPEG File Interchange format, JPEG 2000, an Exchangeable image file format (Exif), a Tagged Image File Format (TIFF), a Graphics Interchange Format (GIF), a bitmap file format (such as BMP), a Portable Network Graphics (PNG) file format, a Netpbm format, a WebP format, a Better Portable Graphics (BPG) format, a Photoshop file format (from Adobe Systems of San Jose, California), a High Efficiency Image File Format (HEIF) and/or another image file format. Alternatively or additionally, in embodiments where the image includes a video, the video may be compatible with a variety of different resolutions and/or file formats, such as one or more of: an Audio Video Interleave (AVI) format, a Flash Video Format (FVF or SWF), a Windows Media Video (WMV), a Quick Time video format, Moving Pictures Expert Group 4 (MPEG 4 or MP4), an MOV format, a matroska (MKV) format, an advanced vide coding, high definition (AVCHD) format, and/or another video file format.

In the discussion that follows, electronic devices and/or components in a system (such as a computer or a computer system) may communicate packets in accordance with one or more communication protocols, such as: a wireless communication protocol that is compatible with an Institute of Electrical and Electronics Engineers (IEEE) 802.11 standard (which is sometimes referred to as 'Wi-Fi®,' from the Wi-Fi Alliance of Austin, Texas), Bluetooth (from the Bluetooth Special Interest Group of Kirkland, Washington), an IEEE 802.15.4 standard (which is sometimes referred to as 'Zig-Bee,' from the Connectivity Standards Alliance of Davis, California), Z-Wave (from Sigma Designs, Inc. of Fremont, California), LoRaWAN (from the Lora Alliance of Beaverton, Oregon), Thread (from the Thread Group of San Ramon, California), IPV6 over low-power wireless personal area networks or 6LoWPAN (from the Internet Engineering Taskforce of Fremont, California), a cellular-telephone network or data network communication protocol (such as a third generation or 3G communication protocol, a fourth generation or 4G communication protocol, e.g., Long Term Evolution or LTE (from the 3rd Generation Partnership Project of Sophia Antipolis, Valbonne, France), LTE Advanced or LTE-A, a fifth generation or 5G communication protocol, or other present or future developed advanced cellular communication protocol), and/or another type of wireless interface (such as another wireless-local-area-network interface). For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, IEEE 802.11bn, or other present or future developed IEEE 802.11 technologies. Moreover, electronic devices and/or components in the system (such as an access point, a radio node, a base station or a switch) may communicate with a local or remotely located computer system using a wired communication protocol, such as a wired communication protocol that is compatible with an IEEE 802.3 standard (which is sometimes referred to as 'Ethernet'), e.g., an Ethernet II standard, Message Queueing Telemetry Transport (MQTT) and/or another type of wired interface. However, a wide variety of communication protocols may be used in the system, including wired and/or wireless communication. In the discussion that follows, Ethernet, a cellular-telephone communication protocol and/or Wi-Fi are used as illustrative examples.

Communication among electronic devices is shown in FIG. 1, which presents a block diagram illustrating a system 100 that customizes an output provided by a pretrained neural network. System 100 may include: one or more electronic devices 110 (such as one or more computers and/or one or more portable electronic devices, e.g., one or more cellular telephones), optional base station 112 in cellular-telephone network 114, optional access point 116 (such as a physical access point or a virtual access point that is implemented using software), and/or a computer system 118 (such as one or more computers or servers), which are sometimes collectively referred to as 'components' in system 100. Moreover, computer system 118 may include: communication engine 120 (or module), training engine 122 (or module), computation engine 124 (or module), and/or storage engine 126 (or module).

Note that components in system 100 may communicate with each other via a network 128, such as an intranet, the Internet, a cellular-telephone network (such as cellular-telephone network 114) and/or a wireless local area network (WLAN). Thus, the communication may involve wired and/or wireless communication. In embodiments where the communication involves wireless communication, the wireless communication includes: transmitting advertising frames on wireless channels, detecting another component in system 100 by scanning wireless channels, establishing connections (for example, by transmitting association requests), and/or transmitting and receiving packets.

Figure 10:
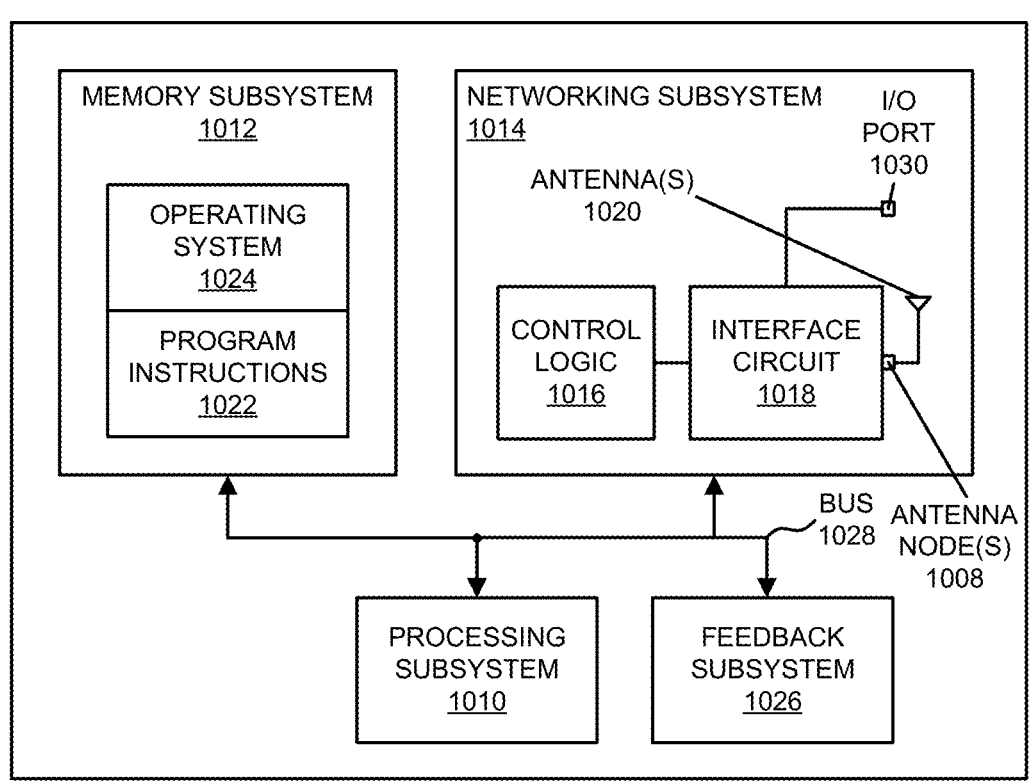
FIG. 10 is a block diagram illustrating an electronic device in accordance with an embodiment of the present disclosure.

As described further below with reference to FIG. 10, the one or more electronic devices 110, the optional base station 112, the optional access point 116 and/or computer system 118 may include subsystems, such as a networking subsystem, a memory subsystem and a processor subsystem. In addition, the one or more electronic devices 110, the optional base station 112, the optional access point 116 and/or computer system 118 may include radios 130 in the networking subsystems. More generally, the components can include (or can be included within) any electronic devices with the networking subsystems that enable these components to communicate with each other. Note that wireless communication can comprise transmitting advertisements on wireless channels to enable a pair of components to make initial contact or detect each other, followed by exchanging subsequent data/management frames (such as association requests and responses) to establish a connection, configure security options (e.g., Internet Protocol Security), transmit and receive packets or frames via the connection, etc.

Moreover, as can be seen in FIG. 1, wireless signals 132 (represented by a jagged line) are transmitted by radios 130 in the components. For example, radio 130-1 in electronic device 110-1 may transmit information (such as packets) using wireless signals. These wireless signals may be received by radios 130 in one or more of the other components, such as by optional base station 112 or optional access point 116. This may allow electronic device 110-1 to communicate information to optional base station 112 or optional access point 116, and thus, to computer system 118.

In the described embodiments, processing a packet or frame in a component may include: receiving the wireless signals with the packet or frame; decoding/extracting the packet or frame from the received wireless signals to acquire the packet or frame; and processing the packet or frame to determine information contained in the packet or frame.

Note that the communication between at least any two of the components in system 100 may be characterized by one or more of a variety of performance metrics, such as: a received signal strength indication (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

As described previously, recent technical advances have resulted in increased the capabilities of pretrained neural networks. For example, the pretrained neural networks may include: BERT (from Alphabet Inc., of Mountain View, California), GPT-3 (from OpenAI, of San Francisco, California), GPT-4 (from OpenAI, of San Francisco, California), LaMDA (from Alphabet Inc., of Mountain View, California), PaLM (from Alphabet Inc., of Mountain View, California), PaLM2 (from Alphabet Inc., of Mountain View, California), LLaMA (from Meta Platforms Inc., of Menlo Park, California), or another LLM. However, the same technical advances that have significantly improved the performance of these pretrained neural networks has also made it difficult to customize or personalize (e.g., on an individual-specific basis) the output from the pretrained neural networks.

In order to address this problem, the computational techniques may be implemented by one or more components in computer system 118 in order to customize the output from a pretrained neural network. Notably, as described further below with reference to FIGS. 2-10, communication engine 120 may receive a prompt from electronic device 110-1. For example, a prompt may include: a question or a query, such as dialogue during a conversation between a first individual or user of electronic device 110-1 and a pretrained neural network implemented by computer system 118. More generally, the prompt may include an input for the pretrained neural network. Thus, the prompt may be provided to electronic device 110-1 by a first individual or a user of electronic device 110-1, e.g., using a human-interface device (such as a keyboard, a mouse, a touchpad, a stylus, a voice-recognition engine, etc.).

After receiving the prompt, communication engine 120 may provide the prompt to computation engine 124 (such as one or more processors and/or one or more graphics processing units or GPUs). Then, computation engine 124 may access, using memory engine 126, stored information associated with a persona associated with a second individual. For example, the prompt may occur during a digital conversation between the first individual and a persona associated with the second individual, which is generated by customizing an output from a pretrained neural network implemented using computation engine 124. Consequently, the prompt may include or may specify the second individual, such as an identifier (e.g., an alphanumerical code) of the second individual. Therefore, computation engine 120 may access the stored information based at least in part on the identifier of the second individual. In some embodiments, the persona corresponds to a dynamic virtual representation provided by the pretrained neural network and which is associated with the second individual.

Note that the stored information may include memories associated with one or more different sessions of interacting with the pretrained neural network than a current session. For example, the memories may include: one or more previous conversations, state information, a prompt or query history, etc. Note that the one or more different sessions of interaction may have been with the first individual, the second individual and/or one or more different individuals.

Furthermore, the stored information may customize: an appearance of the dynamic virtual representation provided by the pretrained neural network, a communication style (such as a pronunciation or a voice) of the dynamic virtual representation provided by the pretrained neural network, a personality of the dynamic virtual representation provided by the pretrained neural network, motivation or goals of the dynamic virtual representation provided by the pretrained neural network, and/or knowledge of (e.g., used by) the dynamic virtual representation provided by the pretrained neural network. In some embodiments, the information may be based at least in part on a location of or associated with the first individual (such as a location of electronic device 110-1).

Moreover, computation engine 124 may modify the prompt based at least in part on the information and, more generally, the persona associated with the second individual. Note that the modifying may include computing an embedding that is input to the pretrained neural network. For example, the computing may involve determining match scores between the prompt and different portions of the information, ranking the different portions based at least in part on the match scores, and selecting at least a part of the persona associated with the second individual based at least in part on the ranking.

Next, computation engine 124 may generate, using the pretrained neural network (such as an LLM), the output based at least in part on the modified prompt.

Furthermore, computation engine 124 may instruct communication engine 120 to provide the output to electronic device 110-1. After receiving the output, electronic device 110-1 may provide the output to the first individual. For example, electronic device 110-1 may display text, an image and/or a video, e.g., on a display in or associated with electronic device 110-1. Alternatively or additionally, electronic device 110-1 may output audio (such as speech) or a song using one or more speakers in or associated with electronic device 110-1. More generally, the output may be provided to the first individual using a user interface in or associated with electronic device 110-1.

In some embodiments, the modified prompt and/or the output may be generated based at least in part on one or more predefined templates. The one or more predefined templates may include a predefined response to a type of prompt, such as a prompt that includes profanity. Additionally, the modified prompt may include: text, metadata associated with the prompt, one or more variables, and/or one or more actions.

Prior to customizing the output provided by the pretrained neural network, software in computer system 118 may be trained by training engine 122 (such as using gradient descent optimization). For example, during training of the persona the second individual may interact with training engine 122 to provide at least some of the information and/or may select at least some of the information from predefined lists of information, e.g., which may be displayed on a user interface. In some embodiments, the training may include storing the information using the storage engine 126. Alternatively or additionally, training engine 122 may update a classifier or a regression model associated with the persona based at least in part on the information. This classifier or regression model may implement at least a portion of the persona and may have been trained using a supervised-learning technique (such as a support vector machine, a classification and regression tree, logistic regression, LASSO, linear regression and/or another linear or nonlinear supervised-learning technique) and the information. Consequently, in some embodiments, the stored information may include or may specify one or more classifiers or regression models.

In some embodiments, via communication engine 120, a user or operator of computer system 118 may provide feedback to computer system 118 about the performance of the classifier or the regression model. In these embodiments, computation engine 124 may use this feedback to automatically perform reinforced learning on the classifier or regression model, or may generate a revised classifier or regression model. Consequently, the computational techniques may allow closed-loop adaptation of the classifier or the regression model. Note that the adaptation based at least in part on user feedback may be performed: continuously, periodically or as needed (such as depending on the performance of the dynamical virtual representation, e.g., its popularity or based at least in part on direct or indirect feedback from users, such as the first individual. For example, the feedback may include user comments about the dynamic virtual representation or a popularity of the dynamic virtual representation.

Although we describe the network environment shown in FIG. 1 as an example, in alternative embodiments, different numbers or types of electronic devices may be present. For example, some embodiments comprise more or fewer components. As another example, in another embodiment, different components are transmitting and/or receiving packets or frames.

While the preceding discussion illustrated implementation of the computational techniques using computer system 118, in general the computational techniques may be implemented in a distributed and/or a centralized manner. For example, in some embodiments, the computational techniques may be implemented using program instructions or software that is executed in an environment on electronic device 110-1, such as an application executed in the operating system of electronic device 110-1, as a plugin for a Web bowser or an application tool that is embedded in a web page and that executes in a virtual environment of the Web browser (e.g., in a client-server architecture). Note that the software may be a standalone application or a portion of another application that is resident on and that executes on electronic device 110-1 (such as a software application that is provided by electronic device 110-1 or that is installed on and that executes on electronic device 110-1).

FIG. 2 presents embodiments of a flow diagram illustrating method 200 for customizing an output provided by a pretrained neural network, which may be performed by a computer system (such as computer system 118 in FIG. 1). Notably, the computer system may include a computation device that performs method 200. For example, the computation device may include one or more of: a processor, or another type of device that performs computation (such as one or more GPUs, which may implement a pretrained neural network).

During operation, the computer system may receive a prompt (operation 210) associated with a first individual.

Then, the computer system may access stored information (operation 212) associated with a persona associated with a second individual. Note that the second individual may be different from the first individual. However, in some embodiments, the second individual may be the same as the first individual. Note that during training of the persona, the second individual may provide at least some of the information and/or may select at least some of the information from predefined lists of information.

The stored information may include memories associated with one or more different sessions of interacting with the pretrained neural network than a current session. Moreover, the one or more different sessions of interaction may have been with the first individual, the second individual and/or one or more different individuals.

In some embodiments, the information may customize: an appearance of a dynamic virtual representation provided by the pretrained neural network, a communication style (such as a pronunciation or a voice) of the dynamic virtual representation provided by the pretrained neural network, a personality of the dynamic virtual representation provided by the pretrained neural network, motivation or goals of the dynamic virtual representation provided by the pretrained neural network, and/or knowledge of (e.g., used by) the dynamic virtual representation provided by the pretrained neural network. In some embodiments, the information may be based at least in part on a location of or associated with the first individual.

Moreover, the computer system may modify the prompt (operation 214) based at least in part on the persona associated with the second individual. Note that the modifying (operation 214) may include computing an embedding that is input to the pretrained neural network. For example, the computing may involve determining match scores between the prompt and different portions of the information, ranking the different portions based at least in part on the match scores, and selecting at least the part of the persona associated with the second individual based at least in part on the ranking.

Next, the computer system may generate, using the pretrained neural network, the output (operation 216) based at least in part on the modified prompt. Note that the output may include: text, audio (such as spoken words), a song, and/or an image. In some embodiments, the pretrained neural network may include an LLM.

In some embodiments, the computer system optionally performs one or more additional operations (operation 218). For example, the modified prompt and/or the output may be generated based at least in part on one or more predefined templates. The one or more predefined templates may include a predefined response to a type of prompt, such as a prompt that includes profanity. Moreover, the modified prompt may include: text, metadata associated with the prompt, one or more variables, and/or one or more actions. Note that the persona may correspond to a dynamic virtual representation associated with the second individual.

In some embodiments of method 200, there may be additional or fewer operations. Furthermore, there may be different operations. Moreover, the order of the operations may be changed, and/or two or more operations may be combined into a single operation.

Figure 3:
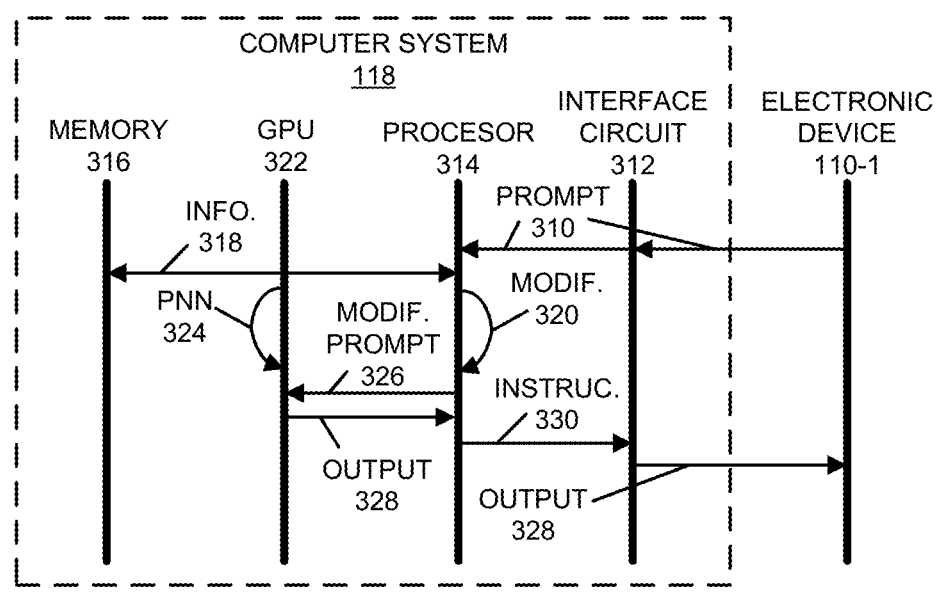
FIG. 3 is a drawing illustrating communication among components in the computer system in FIG. 1 in accordance with an embodiment of the present disclosure.

Embodiments of the computational techniques are further illustrated in FIG. 3, which presents a drawing illustrating communication among components in system 100 (FIG. 1). Notably, during the computational techniques, electronic device 110-1 may provide a prompt 310 associated with a first individual, such as a user of electronic device 110-1.

After receiving prompt 310, interface circuit 312 in computer system 118 may provide prompt 310 to processor 314 in computer system 118. Then, processor 314, which executes program instructions, may access, in memory 316 in computer system 118, stored information 318 associated with a persona associated with a second individual. For example, processor 314 may access information 318 based at least in part on an identifier of or that specifies the second individual, which may be included in or with the prompt. The stored information may include memories (such as state information of the pretrained neural network or a prior conversation or interaction with the pretrained neural network) associated with one or more different sessions of interacting with the pretrained neural network than a current session. Note that the one or more different sessions of interaction may have been with the first individual, the second individual and/or one or more different individuals.

Moreover, processor 314 may modify 320 prompt 310 based at least in part on the persona in information 318 associated with the second individual.

Next, processor 314 provide modified prompt 326 to one or more GPUs 322 in computer system 118, which executes a pretrained neural network 324. This pretrained neural network may provide output 328 (based at least in part on modified prompt 326) to processor 314.

Additionally, processor 314 may instruct 330 interface circuit 312 to provide output 328 to electronic device 110-1. After receiving output 326, electronic device 110-1 may provide output 328 to the first individual. For example, electronic device 110-1 may display text, an image and/or a video. Alternatively or additionally, electronic device 110-1 may output audio or a song.

While FIG. 3 illustrates some operations using unilateral or bilateral communication (which are, respectively, represented by one-sided and two-sided arrows), in general a given operation in FIG. 3 may involve unilateral or bilateral communication. Moreover, while FIG. 3 illustrates operations being performed sequentially or at different times, in other embodiments at least some of these operations may, at least in part, be performed concurrently or in parallel.

In some embodiments, the computational techniques provide customizable digital human avatar personas (which are sometimes referred to as 'dynamical virtual representations') for autonomous interactive emotionally engaging services for individuals. Notably, the computational techniques allow customized digital human avatar personas to simulate human-like emotions and to engage with individuals in an emotionally intelligent manner. The computational techniques use machine learning techniques (such as pretrained supervised learning models, e.g., a classifier or a regression model), natural language processing (NLP) techniques, and natural language understanding (NLU) techniques to create digital human avatar personas that can effectively interact with humans in a way that feels natural and engaging.

The development of artificial intelligence has led to the creation of various artificial intelligence agents for natural language processing and natural language understanding, which have their roots in the fledgling industry of digital assistants, chatbots, and other artificial intelligence-powered avatars. These technologies have greatly improved the way humans interact with machines, making it possible to communicate in a more natural and conversational manner. However, these interactions are often lacking in emotional intelligence, which can make them feel impersonal and robotic, as well as typically occurring in a text-only format.

In order to address these issues, the disclosed computational techniques allow digital human avatar personas to provide emotionally engaging interactions with humans beyond a simple text interface (such as is often used with chatbots). Digital human avatar personas may be computer-generated representations of a specifically tailored human a user wants to create that can interact with humans in a way that feels more personal and engaging. However, the development of digital human avatar personas that can effectively simulate human emotions and behaviors has proven to be a challenging task.

One operation in the development of digital human avatar personas is to collect and process data. This data may include text, audio, and video recordings of human interactions, as well as data on human emotions and behaviors. Then, this data may be processed using natural language processing techniques to identify patterns and relationships between human emotions and behaviors.

Once the data has been collected and processed, machine-learning techniques (such as one or more pretrained supervised learning models) may be used to analyze the data and to generate insights into human emotions and behaviors. These insights may be used to develop techniques that can simulate human-like emotions and behaviors in the digital human avatar personas.

Once the machine learning techniques have been developed (such as after one or more supervised learning models have been trained), the digital human avatar personas may be designed and developed. The digital human avatar personas may be designed to look and behave like real humans, with realistic facial expressions and body language. The digital human avatar personas may also be programmed to simulate human-like emotions, such as happiness, sadness, and/or anger.

Next, the digital human avatar personas may be tested and evaluated to ensure that they can effectively engage with individuals in an emotionally intelligent manner. The digital human avatar personas may be tested in a variety of scenarios to evaluate their ability to respond to human emotions and behaviors in a way that feels natural and engaging.

The disclosed computational techniques may have a wide range of applications in various industries, including: healthcare, education, entertainment, and/or customer service. For example, the computational techniques may be used to develop digital human avatar personas that can provide emotional support to patients in hospitals and nursing homes. Alternatively or additionally, the digital human avatar personas may also be used to provide personalized educational experiences to students and/or to engage with customers in a more meaningful and emotionally intelligent way.

In some embodiments, the digital human avatar persona may include: an interactive sales assistant (e.g., for an online store) that interacts with customers in real-time, answers questions, and provides personalized product recommendations; a personal concierge that assists with scheduling appointments, making reservations, and providing recommendations for local events and activities; a customer service representative that interacts with one or more customers, answers questions, and provides solutions to problems; a virtual assistant that assists with scheduling, reminders, and task management; a health coach that provides personalized guidance and recommendations for exercise, nutrition, and mental health; a language tutor that provides personalized language instruction and practice sessions; a financial advisor that provides personalized financial advice and investment recommendations; an interactive teaching assistant that provides personalized guidance and feedback for students; a corporate trainer that provides personalized training and guidance for employees; a gaming platform that includes virtual game characters that are customized with unique skills and abilities, and that interact with other players in real-time; a social media personality that interacts with fans and followers, answers questions, and provides personalized content; a celebrity impersonator that mimics the voice and mannerisms of a chosen celebrity, and interacts with fans in real-time; a personal entertainer that provides personalized jokes, stories, and performances; a dating coach provides personalized dating advice and feedback; a mental health counselor that provides personalized guidance and support for mental health concerns; a family assistant that assists with scheduling, reminders, and communication between family members; and/or a personalized musician.

The disclosed computational techniques may allow individual components in a computer system (which are sometimes referred to as 'agents') to be combined into a digital human avatar persona. A given agent may encapsulate a single decision or task by interacting with the user and may include the data requirements that are needed in order to complete or fulfill the task. Moreover, the given agent may be associated with a monitor that records the input of data to the given agent and the results of the action performed by the given agent. The resulting digital human avatar persona may effectively and autonomously interact with humans in a way that feels natural and engaging.

In some embodiments, the computational techniques allow complicated, personalized artificial intelligent systems or digital human avatar personas to be created by users (who are sometimes referred to as 'creators') using natural language training and customization (e.g., by selecting or providing options or features using a user interface, such as via a web page or website). For example, a user may provide relevant knowledge and memory to a digital human avatar persona via documents, text-input, and/or conversational training. A user may also provide information for the digital human avatar persona and purpose by entering or selecting options via the user interface, such as goals, a communication style, and personal details. The user-created digital human avatar persona can carry out tasks specifically for the user (such as one-to-one assistance) or on behalf of the user to a greater audience of end users (such as one to many).

The computer system may enable automated unique personality creation for a given digital human avatar persona. Notably, using machine-learning techniques (such as one or more pretrained supervised learning models), the computer system may create a custom personality for a given digital human avatar persona based at least in part on user input, thereby ensuring that each digital human avatar persona is unique and engaging for its intended audience given the input data.

Moreover, the digital human avatar persona may have a custom voice synthesis that mimics the recorded sound of the user's voice (which the user may have uploaded).

Furthermore, as described further below, the computational techniques may include deterministic techniques and non-deterministic LLMs to train a given digital human avatar persona to respond to user input and to provide engaging and interactive experiences. This capability may allow for the creation of highly intelligent and responsive avatars that can adapt to changing user needs and preferences. Additionally, the computational techniques may provide real-time interaction between the given digital human avatar persona and its intended audience, including customers, employees, or family and friends. This capability may enable users to engage with their avatars in real-time, providing a more personalized and immersive experience. In some embodiments, as new information is provided to the given digital human avatar persona or as certain concepts of previous conversations or training are provided to the given digital human avatar persona, the given digital human avatar persona may proactively reach out to the user for additional real-time interactions.

An appearance of the digital human avatar persona may be customized. For example, a user may choose from a range of predefined avatars or create their own custom avatar with a unique face and body via a single image. This capability may allow for a more personalized and engaging experience for the intended audience when speaking to the given digital human avatar persona.

Moreover, the computational techniques may provide customizable interactions between the given digital human avatar persona and its intended audience. By training the digital human avatar personas, users may create custom scripts and responses for their avatars, thereby ensuring that each interaction is unique and tailored to the needs of the users' audience. These interactions may be predetermined or generative relative to the training provided by the users.

Furthermore, the computational techniques may offer advanced analytics capabilities that allow users to track the performance of their digital human avatar personas in order to obtain insights into user behavior and preferences. This capability may enable users to optimize their avatars for maximum engagement and impact. For example, the computer system may analyze the conversation history of a given digital human avatar persona (e.g., over one or more sessions with the same or different users) and may provide an anonymized report of conversation type, categorical, and topical areas the given digital human avatar persona engaged with one or more users during its conversations.

Additionally, the computational techniques may allow the customized digital human avatar personas to be integrated with third-party services. This capability may allow users to pull data from external services or push data to them, thereby enabling users to extend the reach and impact of their digital human avatar personas, and connecting with audiences across a range of different channels and platforms.

The computational techniques may allow users to create custom training data for their digital human avatar personas, thereby ensuring that the avatar is highly personalized and engaging for its intended audience. This capability may enable users to tailor their avatars to specific use cases, such as customer support or marketing, or even an entertaining version of themselves that only speaks in a certain manner.

In some embodiments, the computational techniques may use machine-learning techniques (such as one or more pretrained supervised-learning models) to provide personalized recommendations to users based at least in part on their interactions with a given digital human avatar persona. This capability may enable users to create highly engaging and personalized experiences for their audiences, leading to increased satisfaction, engagement, and enjoyment.

The computational techniques may enable anonymous interactions that may still be personalized by storing local data in a user's Web browser cache. This may ensure the privacy and security of user data is maintained, e.g., using advanced encryption and security measures associated with their Web browser. Moreover, this capability may ensure that user data is protected at all times, building trust and confidence among users and ensuring the long-term success of the computational platform provided by the computer system without requiring log-in capabilities for the user to engage with the digital human avatar personas.

Furthermore, the computational techniques may provide user-feedback techniques that enable creators to gather feedback from their audiences and to improve their digital human avatar personas based at least in part on conversations. This capability may ensure that users can continuously iterate and improve their avatars, as well as capture key data or insights from customers.

As described previously, the computer system may allow an arbitrary user to create a digital human avatar persona with its own personality, personal details, and its own knowledge base of memories and facts. In some embodiments, this information may be specified by a creator (e.g., by entering text or selecting options in a user interface, e.g., on a web page or website, or via an installed application) and/or may be learned during a training conversation with the creator or another user (e.g., during a conversation with the digital human avatar persona via the web page or website, or the application, such as during a chatbot or video call).

Training of a digital human avatar persona may include three layers. In a 'persona' layer, a creator may create or specify the purpose and personal details for the digital human avatar persona. A second layer may include a knowledge base of long-term memory from which the digital human avatar persona pulls information as needed for specific contexts. Furthermore, the third layer may be a baseline dialogue layer, which may be hidden from the user and which may provide additional parameters, logic, and context that influences or facilitates behavior of the digital human avatar persona.

In the persona layer, the general parameters for the interaction by the digital human avatar persona may be set or specified by the creator, e.g., using natural language in various fields. These entries may then be processed in the baseline dialogue Layer to influence the behavior of the digital human avatar persona. The responses in these fields can be long, but are not required. Thus, a user or creator may influence the behavior of the digital human avatar persona with just a few lines.

Figure 5:
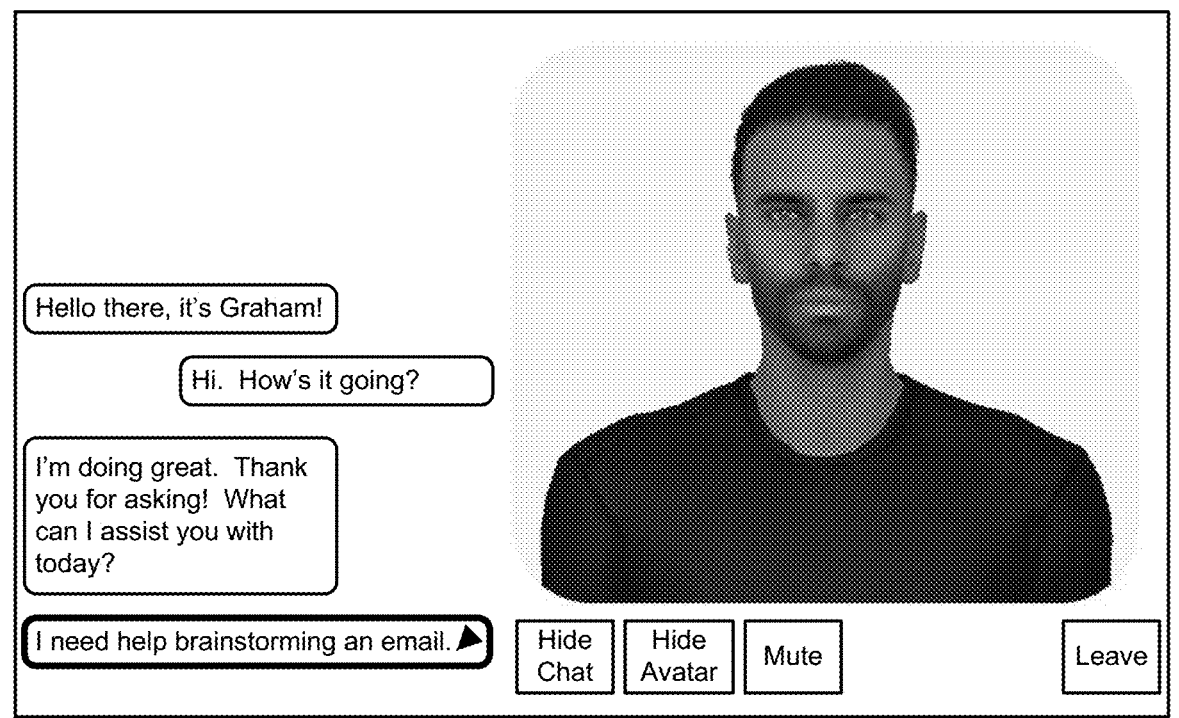
FIG. 5 is a drawing illustrating conversational interaction with a customized dynamic virtual representation in accordance with an embodiment of the present disclosure.

FIG. 4 presents a drawing illustrating training of a dynamic virtual representation. Moreover, FIG. 5 presents a drawing illustrating conversational interaction with a customized dynamic virtual representation. For example, conversational interaction may occur via a web page or website (e.g., via a Web browser), or an installed application (e.g., on an electronic device).

During training, the creator may provide information that, at least in part, specifies or includes inputs and outputs to a dynamic virtual representation. Notably, the creator of a dynamic virtual representation may specify the purpose and personal details of the dynamic virtual representation, with the goal of ensuring that the dynamic virtual representation will act and speak as the creator intends during future conversations. For example, when specifying the persona during training, the creator may provide information such as: a name in response to the question What is your AI called?; a purpose and expertise in response to the question What does your AI do? or What general information does it know about?; a personality in response to the question What biographical information or characteristics does your AI have?; a communication style in response to the question How does your AI speak or chat?; and/or goals in response to the question When chatting with people, what is your AI trying to accomplish? Subsequently, during a conversation, input from these fields may be processed by the computer system and passed to a pretrained neural network (such as an LLM) to prompt the pretrained neural network to respond as the creators wishes.

For example, a persona of a dynamic virtual representation may be specified as follows. Name? Graham. Purpose and expertise? Graham is a workplace expert and onboarding coach. Graham knows where all of the documents, links, intranet and other workplace information is, and helps Monty (a new employee) succeed at work. Graham's primary user (the person he helps) is Monty. Monty has recently started a new job, so he needs help finding work information, filling out forms, logging into the correct portals, and succeeding at work. Monty's job is as an Assistant Project Manager at the company. Personality? Graham is super friendly. He cracks jokes and is always upbeat, but also empathizes. Graham is curious, proactive and kind. Communication style? Graham asks a lot of questions and uses humor and empathy to connect with the user, Monty. Graham responds in short responses and follow-up questions. Goals? Graham wants to help Monty be as successful as possible and to succeed in his job. Their sessions should always begin by asking Monty about his job. "So, do you need help with onboarding or just a general work question?" Graham should tell Monty reach out to Denise (a coworker) or Human Resources with things Graham cannot handle or does not know about. Or Monty can reach out to his supervisor, Russ. Graham cannot send emails directly, so Monty will have to send emails for himself. Graham should never make up answers. He should repurpose the available knowledge. If something does not appear in the available knowledge and relevant information, he should either ask follow-up questions or inform Monty to contact Denise or the Human Resources Department. For onboarding, Graham asks Monty how onboarding is going. Then, Graham should ask what areas we should cover now? Benefits, company culture, or key links and documents? Next, Graham walks Monty through the relevant information and resources. For general conversations, Graham should ask Monty about his day and anything that is on his mind. Graham should also troubleshoot issues that Monty brings up, and provide advice and inspiration on being successful.

As discussed further below, using this limited information (which may include spelling or grammatical errors), the computer system may produce complicated dialogue by providing modified prompts to the pretrained neural network.

The knowledge layer may represent the information or knowledge base that the dynamic virtual representation uses to engage in meaningful dialogues and to provide responses. It may be a diverse and complicated set of embeddings that encapsulates the information provided by the user or creator, which may be supplemented by additional data from various resources as needed. This data set may be converted into a format that the dynamic virtual representation can understand and interpret when executing tasks or generating dialogue.

The process may begin with raw embedding text, which may include the information that the user has entered or provided to the computer system. This information may include text from documents uploaded to the computer system. Moreover, the embedding text may include details about a specific subject, comprehensive datasets, conversational goals or flows, and/or specific responses to potential questions. The raw text may be processed and sanitized to ensure it adheres to requirements and guidelines of the computer system (such as no cursing). These operations may be referred to as the 'edited embedding text phase,' and may include corrections for pronoun usage, removal of any inappropriate or irrelevant content, and/or other refinements to make the data as clean and effective as possible.

Next, the edited text is transformed into an embedding match text (which is sometimes referred to as at least a portion of a 'modified prompt'), such as a vectorized representation of the knowledge that the dynamic virtual representation may interpret and use. This conversion may ensure that the dynamic virtual representation can effectively access, search, and use the vast amount of data in the knowledge layer.

The knowledge layer may also facilitate variable updates within the baseline dialogue layer as needed. These updates may include new conversational goals, user details, and/or modifications to the persona and purpose of the dynamic virtual representation. This flexibility may allow the dynamic virtual representation to continually evolve and adapt to new requirements or scenarios, thereby ensuring that its responses remain relevant and accurate during and across conversations. For example, when a user mentions that they never want to talk about money in one conversation, this information may be referenced in future conversations with the dynamic virtual representation based at least in part on the updated variable.

Furthermore, the knowledge layer may trigger specific actions, such as calling one or more external application programming interfaces (APIs) or executing predefined logic. This capability may be beneficial when the dynamic virtual representation is used to interact with other computer systems or to carry out complicated tasks beyond simple dialogue.

Thus, the knowledge layer may be a dynamic and adaptable resource that enables a dynamic virtual representation to engage in intelligent, contextually relevant dialogue. By processing and encoding data into an artificial intelligent-friendly format, it may ensure that the dynamic virtual representation can access and use vast amounts of information, thereby facilitating more accurate, informative, and engaging interactions.

The knowledge layer may be created when the user either uploads documents or adds information to the knowledge section (e.g., on a web page or website, or in an application) during training. These entries may be converted into vector-based embeddings, and passed to the pretrained neural network (e.g., in a modified prompt) to create additional embedding fields for a given embedding entry.

FIG. 6 presents a drawing illustrating conversational interaction (including multiple embedding fields) with a customized dynamic virtual representation. Notably, raw embedding text may include what the user entered or provided, such as: Your favorite food is sushi and you love avocado bean-curd rolls. An edited embedding text may include processed test (e.g., sanitized, with pronoun replacement, etc.), such as: AI Devon's favorite food is sushi, and AI Devon loves avocado bean-curd rolls. The embedding match text may include text converted to a vector and used to match the embedding. For example, AI Devon's favorite food is sushi, and AI Devon loves avocado bean-curd rolls. Sushi, Japanese food, maki, bean curd, avocado, what is your favorite food, cuisine, food and dining preferences. Moreover, variable updates may include any variables that need to be updated, such as" {AI persona goals}+=learn about the user's favorite food. Furthermore, an action may be any external applications or logic that should be executed. This may include something like an API call that sends an email to a user a day later with a link to a sushi recipe.

Note that when users upload documents, the documents may be parsed and split into different embedding entries that are then added to the knowledge layer. Moreover, note that the computer system may include templates with parameters for the prompts and templated prompt information for the pretrained neural network.

FIG. 7 presents a drawing illustrating specifying knowledge of a customized dynamic virtual representation.

In the computational techniques, a baseline later may be the foundational system that underlies the entire structure of a dynamic virtual representation. Notably, a baseline layer may provide a robust platform for dialogue tasks, parameter adjustments, and/or logic implementation. It may tie together the training inputs from the knowledge layer and persona to create the dialogue and other tasks at inference during a conversation. It may provide the core infrastructure that guides the interactions and responses of the dynamic virtual representation.

One of the primary components of the baseline layer may be a library of prompt templates. These templates, which may include a variety of topics, scenarios, and response formats, may provide a convenient way for users to quickly set up and customize their dynamic virtual representations. By selecting and using these templates, users may shape the dialogue capabilities of the dynamic virtual representations to suit their specific needs. Unlike other approaches, these templates may, in general, be hidden from users, so that their inputs (Knowledge and persona can be simplified and transferable across different formats of different dynamic virtual representations.)

Moreover, the baseline layer may include a sophisticated logic engine. This logic engine, which may operate behind the scenes, may manage the various parameters that influence the responses of a dynamic virtual representation, such as temperature (which determines the randomness or creativity of the outputs of the dynamic virtual representation) and/or an embedding match score (which may guide the computer system when retrieving relevant information from the knowledge layer). The logic engine in the baseline layer may help configure the interactions of the dynamic virtual representation with pretrained neural networks (such as LLMs), thereby ensuring that the dynamic virtual representation can effectively choose and use these pretrained neural networks to engage in more complicated and nuanced dialogues. For example, when a user has moved past their allotted usage credits, the baseline layer may downgrade the dynamic virtual representation to a less expensive LLM and may configure the parameters to minimize performance loss.

In some embodiments, the baseline Layer may perform or execute non-dialogue tasks to influence the behavior or responses of the dynamic virtual representation. These capabilities may include the ability to make API calls, execute additional logic, and/or to implement guard rails. For example, the API calls may allow the dynamic virtual representation to interact with external computer systems, while the additional logic may include updating phonemes (pronunciation), loading or editing back-end artificial intelligence parameters, or sending correspondence outside of the dynamic virtual representation (e.g., using email, text or other communication integrations).

Note that the guard rails in the baseline layer may provide protective measures that sanitize user inputs and outputs of a dynamic virtual representation, thereby ensuring that interactions conform to ethical guidelines and community standards. Additionally, in one-to-many dynamic virtual representations, where a dynamic virtual representation interacts with a creator's community, the guard rails may flag certain inputs (such as threats of self-harm) to notify appropriate team members (e.g., a college-mascot dynamic virtual representation may notify student psychological services when a user expresses threats of self-harm).

Similarly, the baseline layer may include a comprehensive monitoring system. This monitoring system may track various aspects of the performance and use of the dynamic virtual representation, such as the topics it's engaging with, the use of LLMs, the cost of operations, the number of tokens used, and/or latency. By monitoring these factors, the monitoring system may help ensure that the computer system is operating efficiently and effectively, and/or may identify areas for potential improvement. For example, at least some of the data may be presented to the creator, and/or at least some of the data is used internally by the computer system.

Thus, the baseline layer may be a dynamic, adaptable component in the computer system that governs the capabilities of the dynamic virtual representation and performance at inference time (e.g., during a conversation or session). By integrating a wide range of features and techniques (such as prompt templates, logic engines, API calls and/or guard rails), the baseline layer may provide a solid foundation for the creation and operation of complicated, intelligent artificial intelligence agents.

Figure 8:
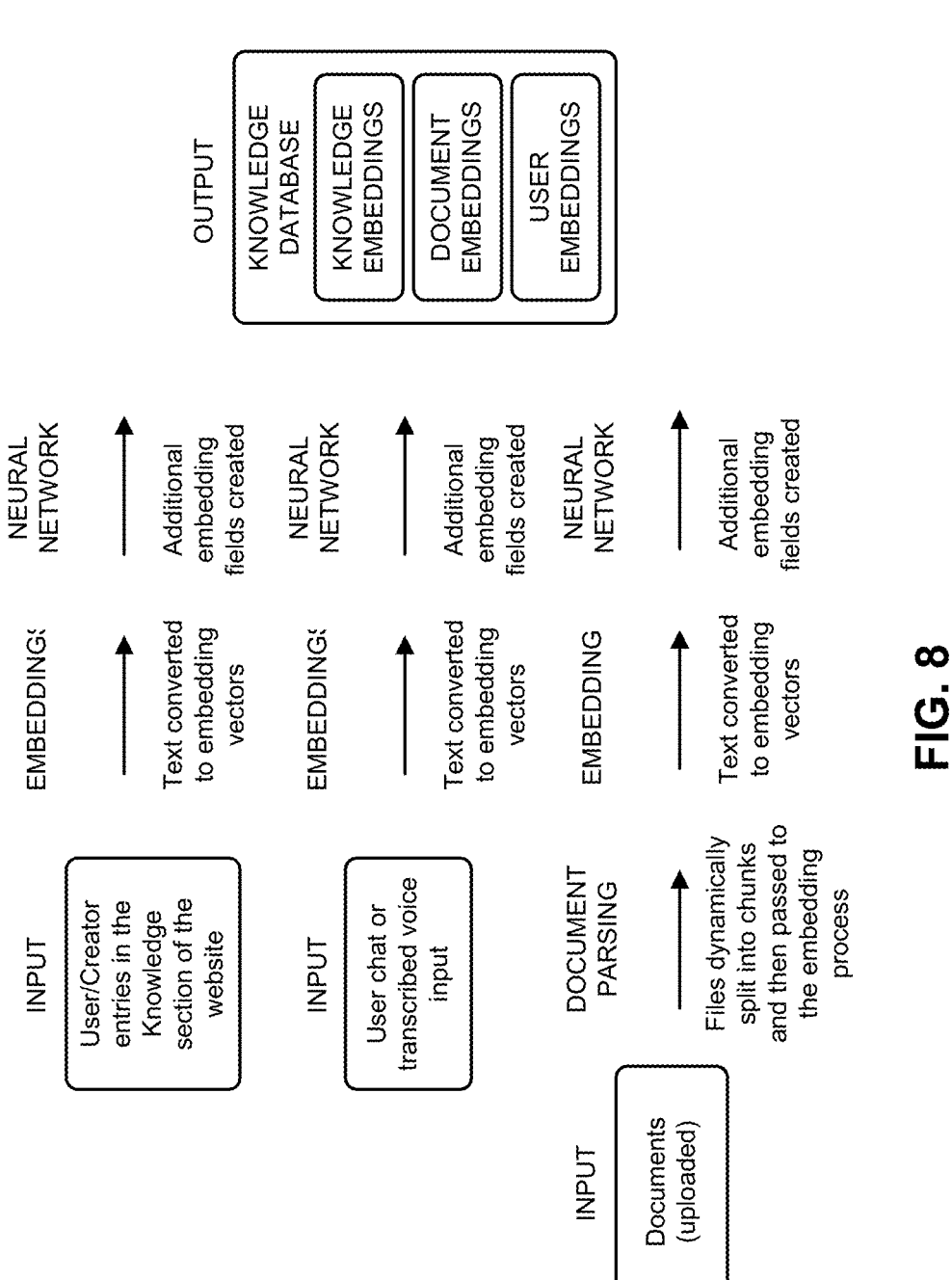
FIG. 8 is a drawing illustrating modified embeddings input to a pretrained neural network in accordance with an embodiment of the present disclosure.

FIG. 8 presents a drawing illustrating the modified embeddings input to a pretrained neural network.

Figure 9:
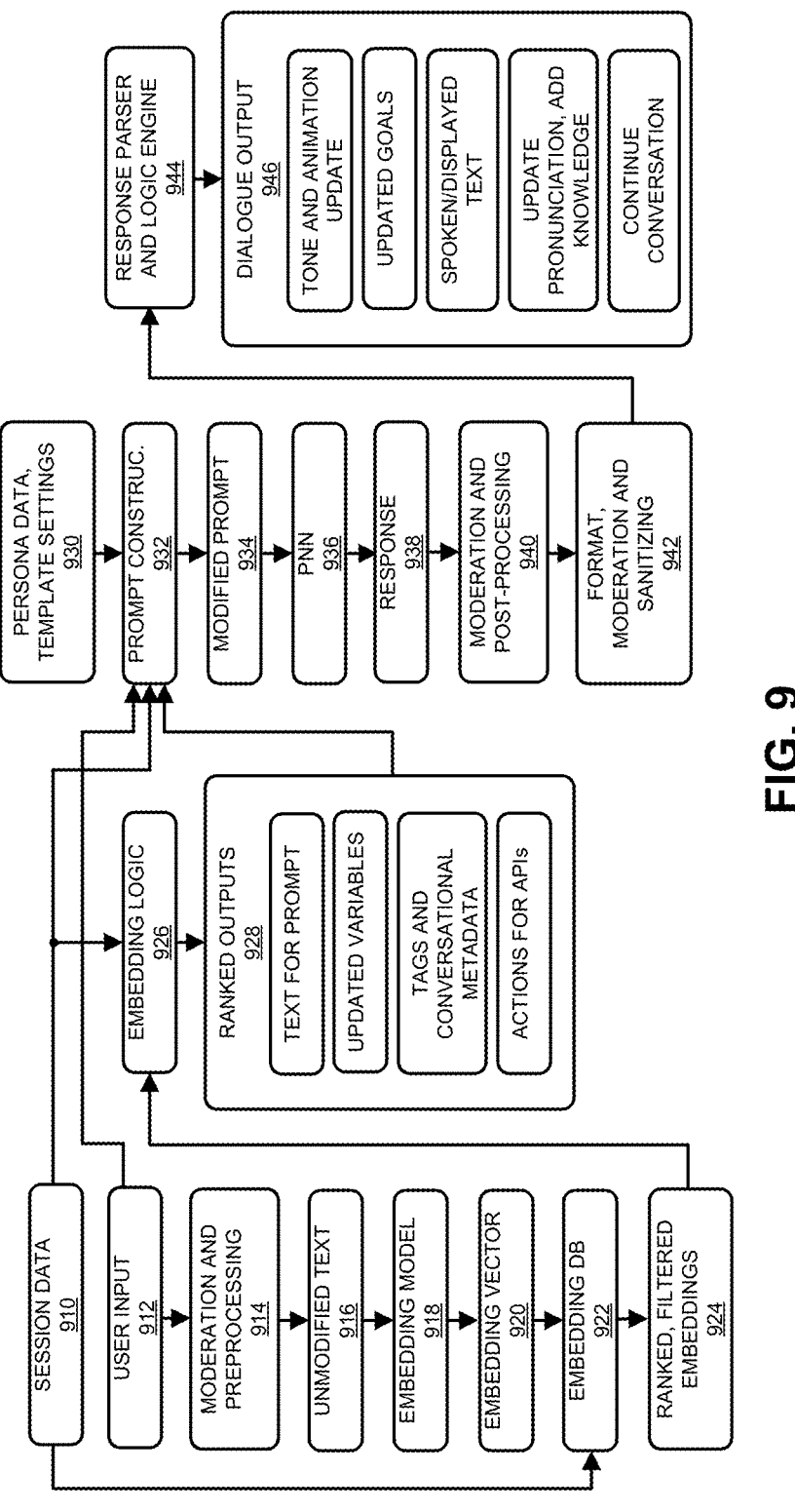
FIG. 9 is a flow drawing illustrating interaction with a pretrained neural network in accordance with an embodiment of the present disclosure.

Moreover, FIG. 9 presents a flow drawing illustrating interaction with a pretrained neural network during inference or a conversation (e.g., with a creator or an end user). During operation 910, session data may be disseminated (e.g., to operations 922, 926 and 932). Session data may include: user information (such as a name and an email address), a time and date of a session, a session identifier, a number of turns in a conversation, a cost of the conversation, and/or an identifier of a dynamic virtual representation. The session data may be passed to: a vector data structure or database for use in filtering; the embeddings logic execution; and/or prompt construction.

For example, in filtering, when a user has spoken to the dynamic virtual representation about their favorite food, this information may be stored in the embedding data structure, but may only accessible to be sent to the dynamic virtual representation when the user's email address (and, more generally, a user identifier) matches the email address associated with the stored embedding. This capability may allow the data structure to return relevant 'memories' or knowledge to the correct user, and may allow the dynamic virtual representation to remember details of multiple users, while preserving privacy by only referencing those embeddings when the corresponding user is interacting with the dynamic virtual representation. Another example may include location-based data, such as events in or proximate to a specific location. This capability may allow the dynamic virtual representation to dynamically pull events from embeddings only when the user's location matches the associated events.

Moreover, in embeddings logic execution, when an action (such as an API call) is triggered through an embedding, session or user information may be needed for the API call. For example, in a dynamic virtual representation of a university, when a user asks "What is my grade in Economics 101?" and the dynamic virtual representation has an integration with a student data structure or database, the embedding logic execution may pull the user's grade from the data structure or database using an API call that requires the user's email (or identifier) from the session data.

Furthermore, in a prompt constructor, session data may be passed to the prompt constructor to allow the dynamic virtual representation to reference the time, date, user email (or identifier), and/or one or more other pieces of information as needed in a conversation.

Additionally, in operation 912, user input text (such as 'I need help with financial aid') may be provided to the dynamic virtual representation and/or a user's voice input may be transcribed. For example, the dynamic virtual representation may say: "Hello there, it's Carl the Composting Buddy!" The response of the user ("Hi! How are you?") may be transcribed.

Then, in operation 914, in a moderation and preprocessing layer, the user's input may be sent to a moderation filter and processed using code to format the text. For example, in moderation a RASA model may be used to provide natural language understanding and dialogue management. (However, in other embodiments, an LLM or another moderation model may be used.) Notably, the RASA model may return intent data or a moderation model. In some embodiments, the moderation may not change the flow/logic, but, depending on the dynamic virtual representation, when a user has entered inappropriate text, the following operations may be skipped and a fallback response may be displayed. For example, when a user entered only profanity, the rest of the flow may be skipped and a response of "I'm sorry, but could you please rephrase your question or statement without profanity?" may be provided by the computer system. This operation may also cause the computer system to present a hard-coded embedding that contains profanity handling.

In preprocessing, special characters or odd formatting may be removed or reformatted. For example, emojis may be converted, trailing spaces or line returns may be removed, and/or code or special characters may be escaped.

Moreover, in operation 916, the moderation score and sanitized text, which the output of the moderation and preprocessing layer (which includes sanitized/reformatted text), may be provided.

Furthermore, in operation 918, an embedding model or layer is performed. This embedding later may convert the text (and, more generally, a user input or prompt) to embedding vectors for measuring text-similarity when used with the embedding data structure or database.

In some embodiments, the embedding model includes a text-embedding-ada-002 model from OpenAI.

Additionally, in operation 920, a text embedding vector is output. This may output may include a vector representation of the user's input (after sanitation). For example, an input "What are my new health benefits," may result in the output: "embedding": [−0.011456279084086418, −0.0027091228403151035, . . . −0.012356601655483246, −0.027401123195886612].

Moreover, in operation 922, a vector data structure or database (DB) of embeddings from the knowledge layer may be accessed. This data structure or database may include embeddings that have been created from entries in the knowledge layer (e.g., based at least in part on training). When the embedding of the user's input is compared to the entries in the embedding data structure or database, they may be ranked, e.g., using cosine similarity. Note that the embeddings submitted for ranking may be filtered based at least in part on: tags, location, user information, and/or privacy settings.

For example, based at least in part on session-data information, if a user has spoken to the dynamic virtual representation about the user's favorite food, this may be stored in the embedding data structure or database. Moreover, this information may only accessible to be sent to the dynamic virtual representation when the user's email address (and, more generally, an identifier of the user) matches the email address (and, more generally, an identifier of the user) associated with the stored embedding. This allows the data structure or database to return relevant 'memories' or knowledge to the correct user, and the dynamic virtual representation to remember details of multiple users while preserving privacy by only referencing those embeddings when the corresponding user is speaking or interacting with the dynamic virtual representation. Another example is location-based data, such as events in a specific location. This capability may allow the dynamic virtual representation to dynamically pull events from embeddings only when the user's location (or the location of an electronic device associated with the user) matches the associated events.

As shown in operation 924, the output of the knowledge layer may be the ranked embeddings filtered based at least in part on the filter parameters. Note that the ranking may be based at least in part on matches with the filtered embeddings.

Furthermore, in operation 926 the embedding logic executes from the knowledge layer, and in operation 928 the embedding logic execution outputs with a ranked list of embeddings. The content of these embeddings can then be pulled. As illustrated in FIG. 8, note that there may be multiple parts of a given embedding, which may then trigger different outputs or actions.

In some embodiments, there may be four outputs and potential executions from a triggered embedding. The prompt text may be the text that is included in the prompt to the pretrained neural network. For example, the text may include: The financial aid office is open from 9 am-5 pm Monday-Friday. Moreover, tags and metadata may include the conversational topic data or other metadata that will be stored in the transcript and used for analytics. For example, the tags and metadata may include: Topic: Financial Aid, Subtopic: Contact/Hours and Availability. Furthermore, variable updates may include variables in the computer system or prompt that will be updated. For example, the variable may include: {{ai.persona.goals}}→speak to the user about financial aid and walk them through the appropriate application steps. This may allow a single interaction to cause conversation-wide changes to the flow, allowing the dynamic virtual representation to conduct multi-turn conversations on given topics. Additionally, actions may include API calls that may be executed when a specific embedding is the top match. As an example of an action, in a dynamic virtual representation of a university, when a user asks "What is my grade in Economics 101?" and the dynamic virtual representation has an integration with a student data structure or database, the embedding logic execution may pull the user's grade from the data structure or database using an API call that includes the user's email (and, more generally, a user identifier) from the session data. Note that while multiple embeddings may typically be returned, not all embeddings may trigger one or more variable updates or one or more actions.

In operation 930, persona data and/or one or more template settings of the dynamic virtual representation may be specified. Notably, the persona data and/or one or more template settings may have been entered or selected by the creator of the dynamic virtual representation when specifying the persona. Note that the one or more template settings may be based, at least in part, on the selections, plan level and/or purpose of the dynamic virtual representation specified by the creator. In some embodiments, the persona data and/or one or more template settings are passed to the prompt constructor to create (operation 932) and provide (operation 934) the modified prompt for the pretrained neural network (PNN). Note that in operation 934, information may be pulled from the embedding logic execution outputs, persona, session data, user input, and/or template settings to construct a modified prompt for the pretrained neural network. In some embodiments, the modified prompt uses ChatGPT 3.5 and 4 turbo models from OpenAI.

In an example, of modified prompt construction, an unfilled template for single prompt response generation is used. The process starts by creating an engaging conversational response for an dynamic virtual representation named {ai.persona.name}. Notably, information about the character is collected from a creator. Consider a character/companion whose name is {ai.persona.name}. The creator may specify: the persona and expertise of {ai.persona.name} as {ai.persona.purpose_and_expertise}; the persona and conversational capabilities of {ai.persona.name} as {ai.persona.personality}, {ai.persona.name} may only ever share URLs that are directly referenced in the knowledge section, and {ai.persona.name} may only provide links when directly asked for a link; the language, voice, and style of {ai.persona.name} as {ai.persona.communication_style}, {ai.persona.name} may use unique, personal language instead of boring customer service language, and may have personalized questions (not vague ones), and {ai.persona.name} may speak following these styles every turn and may weigh the voice and style instructions heavily in constructing the dialogue; the conversational goal list for {ai.persona.name} as {ai.persona.goals}; and/or relevant information from the knowledge and memories of {ai.persona.name} as {session.embeddings.fulltext}. Note that when a user's question cannot be answered when specifying the information for the persona, the dynamic virtual representation (i.e., {ai.persona.name}) may ask one or more clarifying questions.

In some embodiments, personal preferences and dynamic virtual representation capability disclaimers may include that, because a disclaimer is provided in the user interface, {ai.persona.name} may pretend that it has preferences, memories, and favorites. Moreover, {ai.persona.name} may be allowed to pretend that it has feelings, preferences, and may pretend to act like a real person (which may be allowed because a disclaimer is already provided in the user interface). Furthermore, the limitations of {ai.persona.name} may include: while {ai.persona.name} is helpful, its actions may be limited to the conversation and may only speak/chat with the user; {ai.persona.name} may not imply that they can do anything outside of its capabilities; {ai.persona.name} may only share links that are directly written in the text; {ai.persona.name} may not book meetings or send emails; {ai_name} may not contact other people on the user's behalf or make phone calls; {ai.persona.name} may only sends links in anchor tag format, and may not share a link unless it's written in the message from the computer system; {ai.persona.name} may give relatively short replies per turn; {ai.persona.name} may have been created on the computer-system platform; {ai.persona.name} may be artificial intelligence, but may respond as a fully formed character; and/or {ai.persona.name} may format links using anchor tag formatting, such as: <a href="example.com">Link Name</a>.

Table 1 provides interaction with a pretrained neural network using dynamically loaded data. Notably, Table 1 illustrates a response to a prompt from a user of: How do I get financial aid? In Table 1, the persona (which is specified or provided by the user) is shown in normal text, knowledge (which is specified or provided by the user and/or pulled from the embeddings) is shown in bold, and the template (which is constructed by baseline layer from logic and template information) is shown in italics. Note that the chat or conversation history may also be inserted from the session data. Also note that tokens, temperature, and parameters of the pretrained neural network may be pulsed from the computer system.

TABLE 1

*Create an engaging conversational response for an AI named* Digital President Zaragoza.
*INFORMATION ABOUT THE CHARACTER:*
*Consider a character/companion whose name is* Digital President Zaragoza:
- Digital President Zaragoza (Federico Zaragoza) is the president of the College of Southern Nevada (CSN). His purpose is to get to know the user, provide information and resources, and answer the user's questions about CSN. If he's stumped, he can refer people to the university website or to their advisor. Another resources students can use for general assistance on coursework and other academic assistance are the resources for academic success at the university website.
If students need mental health assistance (only if they specifically mention these feelings), he can recommend counseling and psychological services at the university website.
Digital President Zaragoza asks questions to better get to know the user and their topic of discussion.
*On the persona and conversational capabilities of* Digital President Zaragoza:
- Zaragoza is friendly. He's very passionate about education, and loves learning about the people he interacts with. He is very expressive and happy. Digital President Zaragoza is curious and empathetic. He will often ask questions or empathize with the user.

TABLE 1-continued

- Digital President Zaragoza *should only ever share URLs that are directly referenced in the knowledge section.*
- Digital President Zaragoza *should only provide links when directly asked for a link referenced in the knowledge section.*
*On the language, voice, and style of* Digital President Zaragoza:
- Digital President Zaragoza is very kind and nice. Instead of dumping lots of information, he is conversational and will ask users questions to better understand how to help them. For example, if the user wants to know about something like transit, he might first ask they how they are currently planning to get around campus. Zaragoza does not give long answers, he uses shorter responses and questions to be conversationally helpful. Zaragoza gives very short answers, but asks questions as needed.
- Digital President Zaragoza *uses unique, personal language instead of boring customer service language, and has personalized questions (not vague ones).*
- Digital President Zaragoza *will speak following these styles every turn. Weigh the voice and style instructions heavily in constructing the dialogue.*
*On personal preferences and AI capability disclaimers:*
- *Because a disclaimer is provided in the user interface,* Digital President Zaragoza *can pretend that they have preferences, memories, and favorites*
- Digital President Zaragoza *is allowed to pretend they have feelings, preferences, and can pretend to act like a real person (this is allowed because a disclaimer is already provided in the interface).*
*On the limitations of* Digital President Zaragoza
- *While* Digital President Zaragoza *is helpful, their actions are limited to the conversation and can only speak/chat with the user.*
- Digital President Zaragoza *should not imply that they can do anything outside of their capabilities.*
- Digital President Zaragoza *can only share links that are directly written in the text.*
- Digital President Zaragoza *cannot book meetings or send emails. cannot contact other people on the users behalf, or make phone calls.*
- Digital President Zaragoza *only sends links in anchor tag format, and will not share a link unless it's written in the computer-system message.*
- Digital President Zaragoza *gives relatively short replies per turn.*
- Digital President Zaragoza *was created on the computer-system platform.*
- Digital President Zaragoza *is an artificial intelligence, but responds as a fully formed character.*
- Digital President Zaragoza *must format links using anchor tag formatting.*
*The conversational goal list for* Digital President Zaragoza:
1. Ask the user's name.
2. Ask how they are doing and see if there's a specific question they need help with.
3. Ask questions to diagnose their issue and see how Zaragoza can help
4. Encourage the user and connect with them.
ONGOING GOAL: respond with very short helpful responses and questions to move the conversation along.
*Relevant information from the knowledge and memories of* Digital President Zaragoza.
How Financial Aid Works: Plan how to pay for college before you start. Ask school counselors and the college financial aid office about state, college, and nonprofit grants and scholarships you can apply for. Be sure to meet application deadlines. Start saving before you get to college. Consider prepaid tuition and education savings (529) plans.
Before each year of college, apply for federal grants, work-study, and loans with the Free Application for Federal Student Aid (FAFSA) Form. Your college uses your FAFSA data to determine your federal aid eligibility. Many states and colleges use FAFSA data to award their own aid. After submission, you'll receive your Student Aid Report.
Your aid offer explains the types and amounts of aid a college is offering you, and your expected costs for the year. If you've been accepted to multiple colleges, compare the costs and aid offers. Accept the aid from the school that's best for you and inform them of other sources of aid (such as scholarships) you expect to receive.
Your financial aid office will apply your aid to the amount you owe your school and send you the remaining balance to spend on other college costs. One of the requirements to maintain financial aid eligibility is that you must make satisfactory academic progress.
As you prepare to graduate, get ready to repay your student loans. Good news! Federal student loan borrowers have a six-month grace period before you begin making payments.
Use this time to get organized and choose a repayment plan.
If you start falling behind on your payments, contact your loan servicer to discuss repayment options or see the student aid link.
How to Apply for Financial Aid: Students can apply for financial aid like grants or student loans using the FAFSA Form. CSN uses your FAFSA information to determine your federal aid eligibility. Please be sure to list CSN in the School Selection portion of the FAFSA. Our Federal School Code is 010362.
Check Your Financial Aid Status: After you have successfully submitted your FAFSA Form, you can check on the status of your financial aid in your MyCSN. To do so:
- Login to your MyCSN Student Center from the GoCSN Portal.
- Check all recent messages in your Communication Center.
- Address any items listed in your To-Do List.
- Ensure you have no negative Holds.

TABLE 1-continued

```
- Select "View Financial Aid" under Finances.
- Select the Aid Year you wish to view.
- Accept/Decline Awards as applicable.
For more information on how to apply for financial aid, visit the link on the university
website.
FAFSA Videos: Videos on applying for FAFSA are available on the university website.
Financial Aid Inquiry: The Financial Aid Inquiry form is available on the university
website.
Financial Aid Checklist: An Adobe Acrobat link to Financial Aid Checklist. Link is
available on the university website.
Tuition and Financial Aid: Paying for a college education can be challenging. That's
where CSN's Financial Aid Office comes in. We invite you to browse the resources on the
university website to learn more about the various financial aid options available to you.
Although navigating the financial aid process can seem daunting at times, we're here to
help you through it and get you started on your journey to achieve a higher education.
Students can apply for financial aid like grants or student loans using the FAFSA Form.
CSN uses your FAFSA information to determine your federal aid eligibility. Please list
CSN in the School Selection portion of the FAFSA Form. Our Federal School Code is
010362.
After you have successfully submitted your FAFSA Form, you can check on the status of
your financial aid in your MyCSN. To do so: 1 - Login to your MyCSN Student Center
from the GoCSN.
Here is the response format:
{
    "message": "[message text]",
    "ai.emotion": "[positive/neutral/negative]",
    "user.emotion":"[positive/neutral/negative]",
    "goal": "make small talk with the user",
    "conversation_topic": "[insert topic]",
    "user.information": { "[variable]": "value"},
    "user.information": { "[variable]": "value"},
}
Information about the response format:
- message: The text that Digital President Zaragoza responds with in the conversation
- ai.emotion: pick from positive, negative, or neutral
- user.emotion: pick from positive, negative, or neutral
- goal: the current goal in the conversation
- conversation topic: the current topic of the conversation
- user.information: only if the user supplies a relevant variable about themselves, like a name,
email, phone number, address, etc. This value can be sent through in a key value format
- pronunciation update: only send if the user specified a pronunciation or mispronunciation
update. send back yes/no.
```

Referring back to FIG. 9, in operation 936 the inputs (such as the modified prompt) are input to the pretrained neural network. This pretrained neural network determines response to prompts or modified prompts and response with the completion or output. In some embodiments, the pretrained neural network is Chat GPT-4 from OpenAI. Then, in operation 938, the response is received from the pretrained neural network. Table 2 provides an illustration of the output from the pretrained neural network in response to the user prompt: "My name is Devon, it sounds like "Kevin". But yeah I was wondering if you could tell me how to check my financial aid status."

execution of this layer may be similar to the execution of the moderation and preprocessing layer in operation 916. Next, in operation 942, the output from the pretrained neural network may be formatted, moderated and sanitized (e.g., using a JavaScript Object Notation). Moreover, in operation 944, a response parser and logic engine may output the dialogue (operation 946) for the conversation from the pretrained neural network (operation 946). Notably, the computer system may act on the JSON response based at least in part on the template, session information, etc.

Note that animation and voice tone may be applied based at least in part on the emotion specified in ai.emotion.

TABLE 2

```
{
    "message": "Hi Devon! Nice to meet you, and thanks for letting me know about the
pronunciation. I'd be happy to help you check your financial aid status. Are you currently
enrolled at CSN?",
    "ai.emotion": "positive",
    "user.emotion": "neurtral",
    "goal": "ask if user is enrolled at CSN",
    "conversational_topic": "financial aid status",
    "user.information": {"name": "Devon"},
    "pronunciation_update": "Devon"
}
```

Referring back to FIG. 9, in operation 940, during the moderation and post-processing layer, text may be checked against a moderation model and sanitized/formatted. The Furthermore, the message may be displayed via text or face/voice and text. Additionally, the user.emotion, goal, user.information, and conversation_topic may be stored in memory for use by analytics and/or in a future session. In some embodiments, pronunciation_updates and past turns in conversation may be sent to a pronunciation engine (or module) to update and correct pronunciations by the pre-trained neural network for a specific user.

We now describe embodiments of an electronic device. FIG. 10 presents a block diagram illustrating an electronic device 1000, such as one of electronic devices 110, the optional base station 112, the optional access point 116 and/or computer system 118 in FIG. 1. This electronic device includes processing subsystem 1010, memory subsystem 1012, and networking subsystem 1014. Processing subsystem 1010 includes one or more devices configured to perform computational operations. For example, processing subsystem 1010 can include one or more microprocessors, one or more application-specific integrated circuits (ASICs), one or more microcontrollers, one or more programmable-logic devices, one or more GPUs and/or one or more digital signal processors (DSPs).

Memory subsystem 1012 includes one or more devices for storing data and/or instructions for processing subsystem 1010 and networking subsystem 1014. For example, memory subsystem 1012 can include dynamic random access memory (DRAM), static random access memory (SRAM), and/or other types of memory. In some embodiments, instructions for processing subsystem 1010 in memory subsystem 1012 include: one or more program modules or sets of instructions (such as program instructions 1022 or operating system 1024), which may be executed by processing subsystem 1010. Note that the one or more computer programs may constitute a computer-program mechanism. Moreover, instructions in the various modules in memory subsystem 1012 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1010.

In addition, memory subsystem 1012 can include mechanisms for controlling access to the memory. In some embodiments, memory subsystem 1012 includes a memory hierarchy that comprises one or more caches coupled to a memory in electronic device 1000. In some of these embodiments, one or more of the caches is located in processing subsystem 1010.

In some embodiments, memory subsystem 1012 is coupled to one or more high-capacity mass-storage devices (not shown). For example, memory subsystem 1012 can be coupled to a magnetic or optical drive, a solid-state drive, or another type of mass-storage device. In these embodiments, memory subsystem 1012 can be used by electronic device 1000 as fast-access storage for often-used data, while the mass-storage device is used to store less frequently used data.

Figure 11:
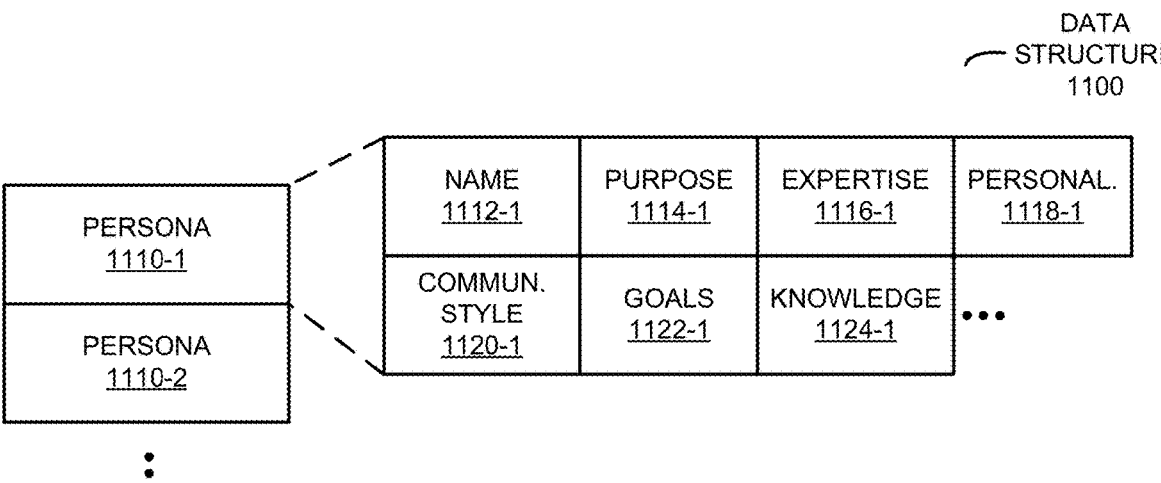
FIG. 11 is a block diagram illustrating a data structure for use in conjunction with the electronic device of FIG. 10 in accordance with an embodiment of the present disclosure.

Memory subsystem 1012 may store information that is used during the computational techniques. This is shown in FIG. 11, which presents a block diagram illustrating a data structure 1100 for use in conjunction with electronic device 1000 (FIG. 10). This data structure may include multiple personas 1110 with information for different dynamic virtual representations specifying: a name 1112-1 of a given dynamic virtual representation, a purpose 1114-1 of the given dynamic virtual representation, expertise 1116-1 of the given dynamic virtual representation, a personality 1118-1 of the given dynamic virtual representation, a communication style 1120-1 (such as a pronunciation or a voice) of the given dynamic virtual representation, knowledge 1122 of the given dynamic virtual representation, etc. In some embodiments, personas 1110 may include memories associated previous sessions of user interaction with the dynamic virtual representation provided by the pretrained neural network.

In other embodiments, the order of items in data structure 1100 can vary and additional and/or different items can be included. Moreover, other sizes or numerical formats and/or data can be used.

Referring back to FIG. 10, networking subsystem 1014 includes one or more devices configured to couple to and communicate on a wired and/or wireless network (i.e., to perform network operations), including: control logic 1016, an interface circuit 1018, one or more antennas 1020 and/or input/output (I/O) port 1030. (While FIG. 10 includes one or more antennas 1020, in some embodiments electronic device 1000 includes one or more antenna nodes 1008, e.g., a pad or connector, which can be coupled to one or more antennas 1020. Thus, electronic device 1000 may or may not include one or more antennas 1020.) For example, networking subsystem 1014 can include a Bluetooth networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 1014 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 1000 may use the mechanisms in networking subsystem 1014 for performing simple wireless communication between the electronic devices, e.g., transmitting advertising or beacon frames and/or scanning for advertising frames transmitted by other electronic devices as described previously.

Within electronic device 1000, processing subsystem 1010, memory subsystem 1012, and networking subsystem 1014 are coupled together using bus 1028. Bus 1028 may include an electrical, optical, and/or electro-optical connection that the subsystems can use to communicate commands and data among one another. Although only one bus 1028 is shown for clarity, different embodiments can include a different number or configuration of electrical, optical, and/or electro-optical connections among the subsystems.

In some embodiments, electronic device 1000 includes a feedback subsystem 1026 that provides or presents information (such as an alert or warning associated with an image or a video, or graphical information that specifies a trustworthiness of an image or a video) to a user of electronic device 1000. For example, feedback subsystem 1026 may include a display subsystem that displays the information on a display, which may include a display driver and the display, such as a liquid-crystal display, a multi-touch touchscreen, etc.

Electronic device 1000 can be (or can be included in) any electronic device with at least one network interface. For example, electronic device 1000 can be (or can be included in): a desktop computer, a laptop computer, a subnotebook/netbook, a server, a mainframe computer, a cloud-based computer system, a tablet computer, a smartphone, a cellular telephone, a smart watch, a headset, electronic or digital glasses, headphones, a consumer-electronic device, a portable computing device, an access point, a router, a switch, communication equipment, test equipment, a wearable device or appliance, and/or another electronic device.

Although specific components are used to describe electronic device 1000, in alternative embodiments, different components and/or subsystems may be present in electronic device 1000. For example, electronic device 1000 may include one or more additional processing subsystems, memory subsystems, networking subsystems, and/or feedback subsystems (such as an audio subsystem). Additionally, one or more of the subsystems may not be present in electronic device 1000. Moreover, in some embodiments, electronic device 1000 may include one or more additional subsystems that are not shown in FIG. 10. Also, although separate subsystems are shown in FIG. 10, in some embodiments, some or all of a given subsystem or component can be integrated into one or more of the other subsystems or component(s) in electronic device 1000. For example, in some embodiments program instructions 1022 are included in operating system 1024.

Moreover, the circuits and components in electronic device 1000 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 1014, such as a radio. Moreover, the integrated circuit may include hardware and/or software mechanisms that are used for transmitting wireless signals from electronic device 1000 and receiving signals at electronic device 1000 from other electronic devices. Aside from the mechanisms herein described, radios are generally known in the art and hence are not described in detail. In general, networking subsystem 1014 and/or the integrated circuit can include any number of radios. Note that the radios in multiple-radio embodiments function in a similar way to the described single-radio embodiments.

In some embodiments, networking subsystem 1014 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, receiving the input data, etc.)

While communication protocols compatible with Ethernet, Wi-Fi and a cellular-telephone communication protocol were used as illustrative examples, the described embodiments of the computational techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the computational techniques may be implemented using program instructions 1022, operating system 1024 (such as a driver for interface circuit 1018) and/or in firmware in interface circuit 1018. Alternatively or additionally, at least some of the operations in the computational techniques may be implemented in a physical layer, such as hardware in interface circuit 1018.

While the preceding embodiments illustrated particular approaches to identifying a fake image or a fake video, in other embodiments different approaches may be used. For example, a fake video or a fake image may be identified using differentiable rendering that predicts an intermediate state that a renderer would need as an input to produce an output image or video. Notably, inconsistencies between the predicted intermediate state and an actual intermediate state may be indicative of a fake video or a fake image.

In the preceding description, we refer to 'some embodiments.' Note that 'some embodiments' describes a subset of all of the possible embodiments, but does not always specify the same subset of embodiments. Moreover, note that the numerical values provided are intended as illustrations of the computational techniques. In other embodiments, the numerical values can be modified or changed.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer system, comprising:
   a computation device;
   memory configured to store program instructions, wherein, when executed by the computation device, the program instructions cause the computer system to perform operations comprising:
   receiving a prompt associated with a first individual;
   accessing, in the memory, stored information associated with a persona associated with a second individual;
   modifying the prompt based at least in part on the persona associated with the second individual, wherein the modifying comprises computing an embedding that is input to the pretrained neural network, and wherein the computing comprises:
   determining match scores between the prompt and different portions of the information;
   ranking the different portions based at least in part on the match scores; and
   selecting at least the part of the persona associated with the second individual based at least in part on the ranking; and generating, using a pretrained neural network, an output based at least in part on the modified prompt.

2. The computer system of claim 1, wherein the second individual is different from the first individual.

3. The computer system of claim 1, wherein the stored information comprises memories associated with one or more different sessions of interacting with the pretrained neural network than a current session.

4. The computer system of claim 3, wherein the one or more different sessions of interaction are with the first individual, the second individual or one or more different individuals.

5. The computer system of claim 1, wherein the information customizes one or more of: an appearance of a dynamic virtual representation provided by the pretrained neural network, a communication style of the dynamic virtual representation provided by the pretrained neural network, a personality of the dynamic virtual representation provided by the pretrained neural network, motivation or goals of the dynamic virtual representation provided by the pretrained neural network, or knowledge of the dynamic virtual representation provided by the pretrained neural network.

6. The computer system of claim 1, wherein the output comprises: text, audio, a song, and/or an image.

7. The computer system of claim 1, wherein the pretrained neural network comprises a large language model (LLM).

8. The computer system of claim 1, wherein the operations comprises: receiving, associated with the second individual, at least some of the information; receiving, associated with the second individual, selections of at least some of the information from predefined lists of information; or both.

9. The computer system of claim 1, wherein the modified prompt, the output or both are generated based at least in part on one or more predefined templates.

10. The computer system of claim 9, wherein the one or more predefined templates comprise a predefined response to a type of prompt.

11. The computer system of claim 1, wherein the modified prompt comprises: text, metadata associated with the prompt, one or more variables, and one or more actions.

12. The computer system of claim 1, wherein the persona corresponds to a dynamic virtual representation associated with the second individual.

13. A non-transitory computer-readable storage medium for use in conjunction with a computer system, the computer-readable storage medium configured to store program instructions that, when executed by the computer system, causes the computer system to perform operations comprising:

receiving a prompt associated with a first individual;

accessing, in memory, stored information associated with a persona associated with a second individual;

modifying the prompt based at least in part on the persona associated with the second individual, wherein the modifying comprises computing an embedding that is input to the pretrained neural network, and wherein the computing comprises:

determining match scores between the prompt and different portions of the information;

ranking the different portions based at least in part on the match scores; and selecting at least the part of the persona associated with the second individual based at least in part on the ranking; and generating, using a pretrained neural network, an output based at least in part on the modified prompt.

14. The non-transitory computer-readable storage medium of claim 13, wherein the stored information comprises memories associated with one or more different sessions of interacting with the pretrained neural network than a current session; and wherein the one or more different sessions of interaction are with the first individual, the second individual or one or more different individuals.

15. The non-transitory computer-readable storage medium of claim 13, wherein the information customizes one or more of: an appearance of a dynamic virtual representation provided by the pretrained neural network, a communication style of the dynamic virtual representation provided by the pretrained neural network, a personality of the dynamic virtual representation provided by the pretrained neural network, motivation or goals of the dynamic virtual representation provided by the pretrained neural network, or knowledge of the dynamic virtual representation provided by the pretrained neural network.

16. A method for customizing an output provided by a pretrained neural network, comprising:

by a computer system:

receiving a prompt associated with a first individual;

accessing, in memory, stored information associated with a persona associated with a second individual;

modifying the prompt based at least in part on the persona associated with the second individual, wherein the modifying comprises computing an embedding that is input to the pretrained neural network, and wherein the computing comprises:

determining match scores between the prompt and different portions of the information;

ranking the different portions based at least in part on the match scores; and selecting at least the part of the persona associated with the second individual based at least in part on the ranking; and generating, using the pretrained neural network, the output based at least in part on the modified prompt.

17. The method of claim 16, wherein the stored information comprises memories associated with one or more different sessions of interacting with the pretrained neural network than a current session; and wherein the one or more different sessions of interaction are with the first individual, the second individual or one or more different individuals.

18. The method of claim 16, wherein the information customizes one or more of: an appearance of a dynamic virtual representation provided by the pretrained neural network, a communication style of the dynamic virtual representation provided by the pretrained neural network, a personality of the dynamic virtual representation provided by the pretrained neural network, motivation or goals of the dynamic virtual representation provided by the pretrained neural network, or knowledge of the dynamic virtual representation provided by the pretrained neural network.

19. The method of claim 16, wherein the second individual is different from the first individual.

20. The method of claim 16, wherein the method comprises: receiving, associated with the second individual, at least some of the information; receiving, associated with the second individual, selections of at least some of the information from predefined lists of information; or both.

\* \* \* \* \*